US011875755B2

(12) United States Patent
Yoon et al.

(10) Patent No.: US 11,875,755 B2
(45) Date of Patent: Jan. 16, 2024

(54) METHOD OF DRIVING LIGHT EMITTING DIODE BACKLIGHT UNIT AND DISPLAY DEVICE PERFORMING THE SAME

(71) Applicant: Samsung Electronics Co., Ltd., Suwon-si (KR)

(72) Inventors: Hyunji Yoon, Suwon-si (KR); Yangwook Kim, Suwon-si (KR); Kyungchun Kim, Suwon-si (KR); Sukyun Woo, Suwon-si (KR); Pansoo Kim, Suwon-si (KR); Byungil Kim, Suwon-si (KR); Hyeongtae Kim, Suwon-si (KR); Jisu Yoon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/068,861

(22) Filed: Dec. 20, 2022

(65) Prior Publication Data

US 2023/0230551 A1 Jul. 20, 2023

(30) Foreign Application Priority Data

Jan. 14, 2022 (KR) ........................ 10-2022-0005908
Apr. 19, 2022 (KR) ........................ 10-2022-0048094

(51) Int. Cl.
*G09G 3/34* (2006.01)
*G09G 3/32* (2016.01)

(52) U.S. Cl.
CPC ............. *G09G 3/3406* (2013.01); *G09G 3/32* (2013.01); *G09G 2300/0819* (2013.01); *G09G 2310/0202* (2013.01); *G09G 2330/021* (2013.01)

(58) Field of Classification Search
CPC ................... G09G 3/3406; G09G 3/32; G09G 2300/0819; G09G 2310/0202; G09G 2330/021; G09G 3/342; G09G 3/3426
See application file for complete search history.

(56) References Cited

U.S. PATENT DOCUMENTS 7,046,225 B2 5/2006 Chou
7,545,354 B2 6/2009 Ha et al.
7,868,880 B2 1/2011 Ozaki et al.
8,283,967 B2 10/2012 Chaji et al.
(Continued)

FOREIGN PATENT DOCUMENTS

KR 10-1130903 B1 3/2012

*Primary Examiner* — Antonio Xavier
(74) *Attorney, Agent, or Firm* — Harness, Dickey & Pierce, P.L.C.

(57) ABSTRACT

A method of driving a light emitting diode (LED) backlight unit, which includes a plurality of LED elements that are connected to a plurality of gate lines and a plurality of source lines, includes generating a plurality of gate signals applied to the plurality of gate lines. While the plurality of gate signals are generated, a non-overlap interval between activation intervals of two adjacent gate signals is generated. All of the plurality of gate signals are deactivated during the non-overlap interval. A plurality of source signals applied to the plurality of source lines are generated. While the plurality of source signals are generated, a high-impedance (Hi-Z) interval included in the non-overlap interval is generated. At least some of the plurality of source signals have a high-impedance state during the high-impedance interval.

20 Claims, 21 Drawing Sheets

(56) References Cited

U.S. PATENT DOCUMENTS

| | | | | |
|---|---|---|---|---|
| 8,519,919 | B2 | 8/2013 | Uchino et al. | |
| 10,438,551 | B2 | 10/2019 | Fan | |
| 2008/0001876 | A1 * | 1/2008 | Ito | G09G 3/3655 345/87 |
| 2009/0167739 | A1 * | 7/2009 | Tsubata | G09G 3/3659 345/94 |
| 2010/0066719 | A1 * | 3/2010 | Hirao | G09G 3/3688 345/98 |
| 2013/0155124 | A1 | 6/2013 | Tsuge | |
| 2021/0201813 | A1 * | 7/2021 | Oh | G09G 3/3266 |

* cited by examiner

METHOD OF DRIVING LIGHT EMITTING DIODE BACKLIGHT UNIT AND DISPLAY DEVICE PERFORMING THE SAME

CROSS-REFERENCE TO RELATED APPLICATIONS

This application claims priority under 35 USC § 119 to Korean Patent Application No. 10-2022-0005908 filed on Jan. 14, 2022 and to Korean Patent Application No. 10-2022-0048094 filed on Apr. 19, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of driving light emitting diode (LED) backlight units included in display devices, and display devices performing the methods of driving LED backlight units.

2. Description of the Related Art

A display device includes a display panel for displaying an image and a display driving circuit for driving the display panel. Recently, an LED backlight unit including a plurality of LED elements is widely used as a backlight unit (or backlight device) included in a display panel, and a local dimming scheme in which LED elements are driven for each area in the display panel is applied to the LED backlight unit. In particular, a full array local dimming (FALD) scheme in which LED elements are arranged in a two-dimensional (2D) array over the entire area of a display panel and the LED elements are driven for each area in the display panel has been researched. A large number of LED elements are required for the full array local dimming scheme, and thus various methods for efficiently driving the LED elements have been researched.

SUMMARY

Some example embodiments of the present inventive concepts provide a method of driving a light emitting diode (LED) backlight unit capable of improving performance and reducing power consumption by organically operating gate signals and data signals applied to the LED backlight unit.

Some example embodiments of the present inventive concepts provide a display device configured to perform the method of driving the LED backlight unit.

According to some example embodiments, a method of driving a light emitting diode (LED) backlight unit including a plurality of LED elements that are connected to a plurality of gate lines and a plurality of source lines, may include generating a plurality of gate signals applied to the plurality of gate lines. The method may include generating, while the plurality of gate signals are generated, a non-overlap interval between activation intervals of two adjacent gate signals. All of the plurality of gate signals may be deactivated during the non-overlap interval. The method may include generating a plurality of source signals applied to the plurality of source lines. The method may include generating, while the plurality of source signals are generated, a high-impedance (Hi-Z) interval included in the non-overlap interval. At least some of the plurality of source signals may have a high-impedance state during the high-impedance interval.

According to some example embodiments, a display device may include a light emitting diode (LED) backlight unit and a backlight driver. The LED backlight unit may include a plurality of LED elements that are connected to a plurality of gate lines and a plurality of source lines. The backlight driver may drive the LED backlight unit. The backlight driver may generate a plurality of gate signals applied to the plurality of gate lines, may generate, while the plurality of gate signals are generated, a non-overlap interval between activation intervals of two adjacent gate signals, may generate a plurality of source signals applied to the plurality of source lines, and may generate, while the plurality of source signals are generated, a high-impedance (Hi-Z) interval included in the non-overlap interval. All of the plurality of gate signals may be deactivated during the non-overlap interval. At least some of the plurality of source signals may have a high-impedance state during the high-impedance interval.

According to some example embodiments, a method of driving a light emitting diode (LED) backlight unit including a plurality of LED elements that are connected to a plurality of gate lines and a plurality of source lines, may include activating a first gate signal of a plurality of gate signals applied to a first gate line among the plurality of gate lines during a first gate-on interval. The method may include outputting, while the first gate signal are activated, a first source signal to generate a first driving current supplied to a first LED element among the plurality of LED elements. The first LED element may be connected to the first gate line and is connected to a first source line among the plurality of source lines. The method may include activating, during a second gate-on interval after the first gate-on interval, a second gate signal of the plurality of gate signals applied to a second gate line among the plurality of gate lines. The second gate line may be adjacent to the first gate line. The method may include outputting, while the second gate signal is activated, the first source signal to generate a second driving current supplied to a second LED element among the plurality of LED elements. The second LED element may be connected to the second gate line and is connected to the first source line. The method may include deactivating, during a first non-overlap interval between the first gate-on interval and the second gate-on interval, all of the plurality of gate signals applied to the plurality of gate lines. The method may include controlling, during a first high-impedance interval included in the first non-overlap interval, the first source signal such that the first source signal has a high-impedance state. The first and second LED elements may be configured to maintain a light-emitting state subsequent to the first and second gate signals being deactivated subsequent to the first and second gate-on intervals. At least one of a starting time point, an ending time point, or a length of the first high-impedance interval may be changeable.

According to some example embodiments, a display device may include a pixel driver, a plurality of pixel circuits, a light emitting diode (LED) backlight unit, and a display panel. The pixel driver may be configured to generate a plurality of gate signals and a plurality of source signals. The plurality of pixel circuits may be configured to generate a plurality of driving currents based on the plurality of gate signals and the plurality of source signals that are received through a plurality of gate lines and a plurality of source lines. The LED backlight unit may include a plurality of LED elements configured to emit light based on the plurality of driving currents. The display panel is on the LED backlight unit, and the display panel may be configured to display an image based on the light emitted by the LED backlight unit. The pixel driver includes a first switch between a first source line configured to output a first source signal and a ground voltage. The pixel driver may be configured to, in response to the first switch being closed, form a first current path between the first source line and the ground voltage, and the first source signal may have a high-impedance (Hi-Z) state based on the first current path.

In the method of driving the LED backlight unit according to some example embodiments and the display device according to some example embodiments, the non-overlap interval may be added to the plurality of gate signals, the high-impedance interval may be added to the plurality of source signals, and the gate signals and the source signals (or the non-overlap interval and the high-impedance interval) may operate organically with each other. For example, the timing of the high-impedance interval may be determined in conjunction with (or interoperable with) the non-overlap interval, and an auto-reset and a malfunction prevention may be performed in an abnormal situation. Accordingly, the non-overlap timing for the gate signals and the high-impedance output timing for the source signals associated with the gate signals may be efficiently controlled, and the peak power may be reduced and the performance may be improved based on matching the driving timings of the gate signals and the source signals during the operation of the LED backlight unit.

In addition, the non-overlap interval and the high-impedance interval may be simultaneously controlled using one driver chip (e.g., one pixel driver), and the non-overlap interval and the high-impedance interval may be adjusted by setting a resistor included in the chip based on an external input signal. Accordingly, the above-described functions may be implemented within the driver chip rather than outside the chip, and the manufacturing cost may be reduced.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
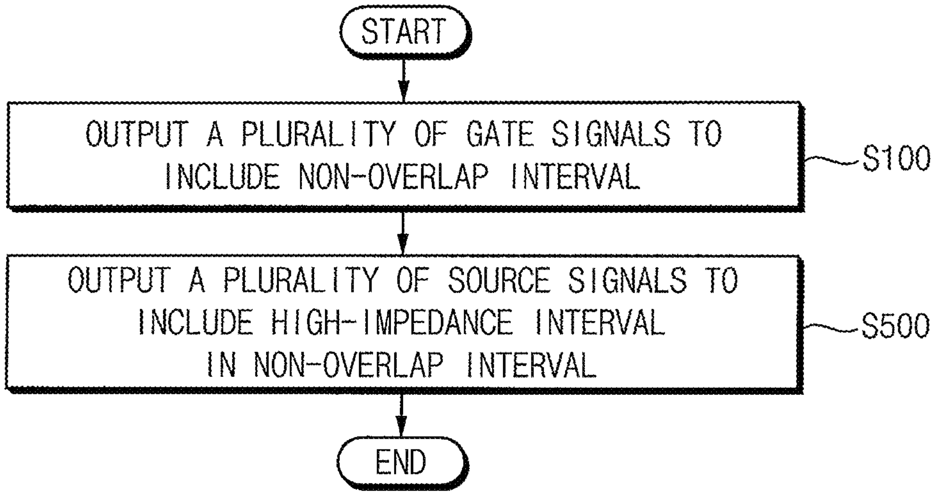
FIG. 1 is a flowchart illustrating a method of driving a light emitting diode (LED) backlight unit according to some example embodiments.

Various example embodiments will be described more fully with reference to the accompanying drawings, in which embodiments are shown. The present inventive concepts may, however, be embodied in many different forms and should not be construed as limited to the example embodiments set forth herein. Like reference numerals refer to like elements throughout this application.

It will be understood that when an element is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular,"

or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed "by" performing additional operations, it will be understood that the operation may be performed "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.).

FIG. 1 is a flowchart illustrating a method of driving a light emitting diode (LED) backlight unit according to some example embodiments.

Referring to FIG. 1, a method of driving a light emitting diode (LED) backlight unit (BLU) according to some example embodiments is performed to drive or operate an LED backlight unit including a plurality of LED elements that are connected to a plurality of gate lines and a plurality of source lines and are arranged in a matrix formation. In addition, the method of driving the LED backlight unit according to some example embodiments may be performed by a backlight driver (or driving circuit) configured to drive the LED backlight unit. For example, the LED backlight unit and the backlight driver may be included in a display device. Configurations of the LED backlight unit, the backlight driver, and the display device including the LED backlight unit and the backlight driver will be described in detail with reference to FIGS. 4, 5, 6 and 7.

In the method of driving the LED backlight unit according to some example embodiments, a plurality of gate signals applied to the plurality of gate lines are output such that the plurality of gate signals include a non-overlap interval (or period or section) (step S100). The non-overlap interval represents a time interval during which all of the plurality of gate signals are deactivated. Step S100 will be described in detail with reference to FIGS. 2, 8, 14 and 15.

A plurality of source signals applied to the plurality of source lines are output such that at least some of the plurality of source signals include a high-impedance (Hi-Z) interval included in the non-overlap interval (step S500). The high-impedance interval represents a time interval during which at least some of the plurality of source signals have a high-impedance state. Step S500 will be described in detail with reference to FIGS. 3, 9, 12, 16 and 17.

In some example embodiments, the LED backlight unit may be driven or may operate based on an active matrix (AM) scheme and a current driving scheme. The active matrix scheme and the current driving scheme will be described with reference to an example of the LED backlight unit illustrated in FIGS. 6 and 7.

In some example embodiments, the plurality of gate signals and the plurality of source signals may operate organically with each other, e.g., a timing of the high-impedance interval may be determined in association with the non-overlap interval. Examples of the non-overlap interval included in the plurality of gate signals and the high-impedance interval included in the plurality of source signals will be described with reference to FIGS. 10A, 10B, 10C, 10D, 11A, 11B, 13A and 13B.

In some example embodiments, steps S100 and S500 may be performed during one frame interval (or frame period) during which the display device including the LED backlight unit displays one frame image. When the display device sequentially displays a plurality of frame images, steps S100 and S500 may be repeatedly performed whenever the display device displays one frame image.

Figure 2:
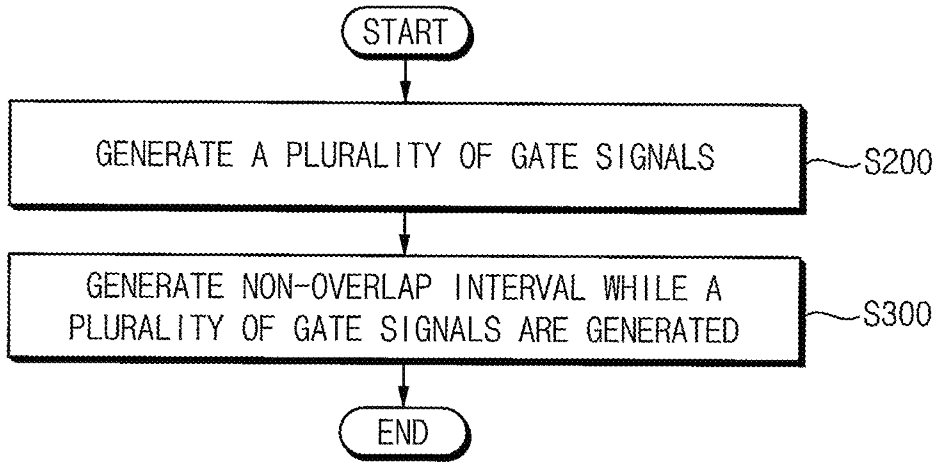
FIG. 2 is a flowchart illustrating an example of outputting a plurality of gate signals in FIG. 1 according to some example embodiments.

FIG. 2 is a flowchart illustrating an example of outputting a plurality of gate signals in FIG. 1 according to some example embodiments.

Referring to FIGS. 1 and 2, when outputting the plurality of gate signals to include the non-overlap interval (step S100), the plurality of gate signals applied to the plurality of gate lines are generated (step S200). For example, the plurality of gate signals may be sequentially activated. However, example embodiments are not limited thereto. For another example, the plurality of gate signals may be activated out of sequence, two or more gate signals may be activated simultaneously, or the plurality of gate signals may be activated without a predetermined rule.

For example, the plurality of gate lines may include first to N-th gate lines that are sequentially arranged, and the plurality of gate signals may include first to N-th gate signals that are applied to the first to N-th gate lines, respectively, where N is a natural number greater than or equal to two. The first to N-th gate signals may be sequentially activated during one frame interval during which the display device displays one frame image.

While the plurality of gate signals are generated, the non-overlap interval during which all of the plurality of gate signals are deactivated is generated (step S300). For example, the non-overlap interval may be inserted and/or added between activation intervals (or gate-on intervals) of two adjacent gate signals. For example, adjacent gate signals may represent that gate lines to which the gate signals are applied are adjacent to each other physically and/or in a position. However, example embodiments are not limited thereto. For another example, adjacent gate signals may represent that activation timings of the gate signals are adjacent to each other temporally.

For example, a first non-overlap interval may be generated between a first activation interval (or a first gate-on interval) during which the first gate signal applied to the first gate line is activated and a second activation interval (or a second gate-on interval) during which a second gate signal applied to a second gate line adjacent to the first gate line is activated. Similarly, a second non-overlap interval may be generated between the second activation interval and a third activation interval (or a third gate-on interval) during which a third gate signal applied to a third gate line adjacent to the second gate line is activated.

Figure 3:
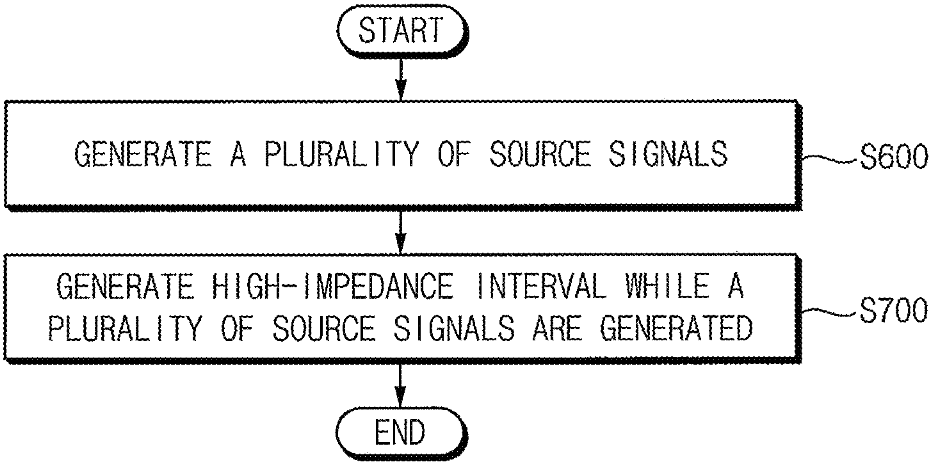
FIG. 3 is a flowchart illustrating an example of outputting a plurality of source signals in FIG. 1 according to some example embodiments.

FIG. 3 is a flowchart illustrating an example of outputting a plurality of source signals in FIG. 1 according to some example embodiments.

Referring to FIGS. 1 and 3, when outputting the plurality of source signals to include the high-impedance interval (step S500), the plurality of source signals applied to the plurality of source lines are generated (step S600). For example, the plurality of source signals may be generated such that drive a plurality of LED elements are driven in response to activation intervals of the plurality of gate signals.

For example, the plurality of source lines may include first to M-th source lines that are sequentially arranged, and the plurality of source signals may include first to M-th source signals that are applied to the first to M-th source lines, respectively, where M is a natural number greater than or equal to two. During the first activation interval during which the first gate signal applied to the first gate line is activated, the first to M-th source signals may be generated such that the first to M-th source signals have values (or voltage levels) for driving LED elements connected to the first gate line (e.g., for generating driving currents supplied to the LED elements connected to the first gate line). Similarly, during the second activation interval during which the second gate signal applied to the second gate line is activated, the first to M-th source signals may be generated such that the first to M-th source signals have values for driving LED elements connected to the second gate line.

While the plurality of source signals are generated, the high-impedance interval during which at least some of the plurality of source signals have the high-impedance state is generated (step S700). For example, the high-impedance interval may be inserted and/or added such that the high-impedance interval is included within the non-overlap interval.

For example, a first high-impedance interval may be generated such that the first high-impedance interval is included in the first non-overlap interval between the first activation interval during which the first gate signal is activated and the second activation interval during which the second gate signal is activated, and at least one of the first to M-th source signals may have the high-impedance state during the first high-impedance interval. Similarly, a second high-impedance interval may be generated such that the second high-impedance interval is included in the second non-overlap interval between the second activation interval and the third activation interval during which the third gate signal is activated, and at least one of the first to M-th source signals may have the high-impedance state during the second high-impedance interval.

In some example embodiments, step S700 may always be performed. In other words, all non-overlap intervals may include the high-impedance interval.

In other example embodiments, step S700 may be selectively performed. In other words, some non-overlap intervals may include the high-impedance interval, and the other non-overlap intervals may not include the high-impedance interval.

When a LED backlight unit including a plurality of LED elements operates based on an active matrix scheme and a current driving scheme, various problems may occur. For example, since a source signal is applied based on the current driving scheme, a new current path may be formed and an output value of the source signal may be changed when adjacent gate signals are simultaneously turned on. In addition, since the response speed of the LED element is relatively fast, the brightness (or luminance) of the LED element may be changed even if the settling times of a gate signal and the source signal is slightly shifted. Further, since the source signal is applied based on the current driving scheme, a voltage at a corresponding node is changed to near a power supply voltage when the current path is cut, which may affect the settling time when outputting a next source signal.

In the method of driving the LED backlight unit according to some example embodiments, and in a display device according to some example embodiments which may be configured to implement the method, the non-overlap interval may be added to the plurality of gate signals, the high-impedance interval may be added to the plurality of source signals, and the gate signals and the source signals (or the non-overlap interval and the high-impedance interval) may operate organically with each other. For example, the timing of the high-impedance interval may be determined in conjunction with (or interoperable with) the non-overlap interval, and an auto-reset and a malfunction prevention may be performed in an abnormal situation. Accordingly, the non-overlap timing for the gate signals and the high-impedance output timing for the source signals associated with the gate signals may be efficiently controlled, and the peak power (e.g., peak power consumption of the LED backlight unit, peak power consumption of a display device including the LED backlight unit and implementing the method, etc.) may be reduced and the performance (e.g., performance of the LED backlight unit, performance of a display device including the LED backlight unit and implementing the method, etc.) may be improved based on matching the driving timings of the gate signals and the source signals during the operation of the LED backlight unit.

In addition, the non-overlap interval and the high-impedance interval may be simultaneously controlled using one driver chip (e.g., one pixel driver), and the non-overlap interval and the high-impedance interval may be adjusted by setting a resistor included in the chip based on an external input signal. Accordingly, the above-described functions may be implemented within the driver chip rather than outside the chip, and the manufacturing cost (e.g., manufacturing cost to manufacture the LED backlight unit, peak power consumption of a display device including the LED backlight unit and implementing the method, etc.) may be reduced.

Figure 4:
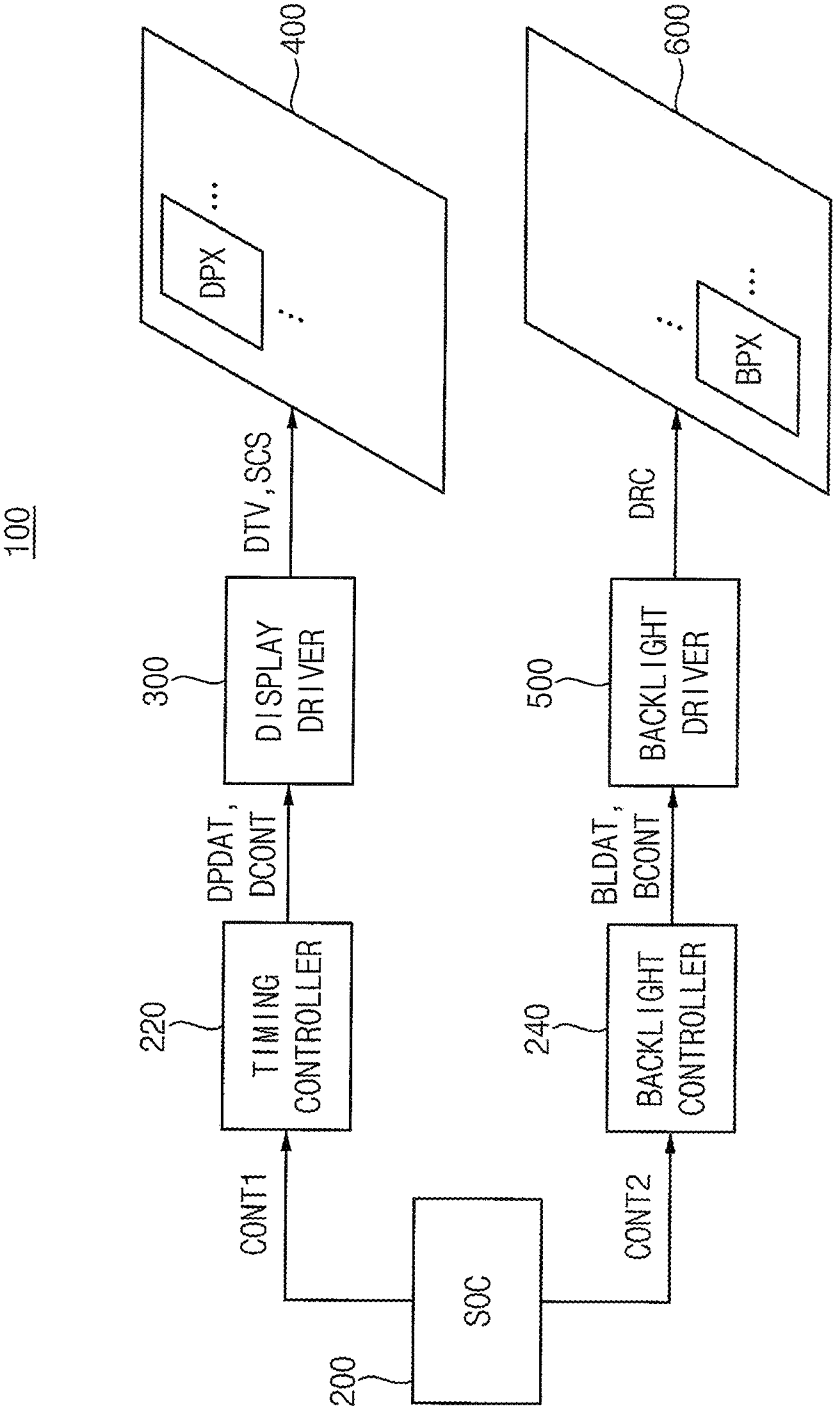
FIG. 4 is a block diagram illustrating a display device according to some example embodiments.

FIG. 4 is a block diagram illustrating a display device according to some example embodiments.

Referring to FIG. 4, a display device 100 includes a backlight driver 500 and an LED backlight unit 600. The display device 100 may further include a system-on-chip (SOC) 200, a timing controller 220, a backlight controller 240, a display driver 300 and a display panel 400.

The LED backlight unit 600 may include a plurality of backlight pixels BPX that are arranged in a matrix formation having a plurality of rows and a plurality of columns. For example, as will be described with reference to FIG. 6, the plurality of backlight pixels BPX may include a plurality of LED elements that are connected to a plurality of gate lines and a plurality of source lines.

The backlight driver 500 may drive the LED backlight unit 600. For example, the backlight driver 500 may generate a plurality of driving currents DRC for driving the plurality of backlight pixels BPX based on backlight driving data BLDAT and a backlight control signal BCONT that are provided from the backlight controller 240. For example, the backlight driving data BLDAT and the backlight control signal BCONT may be provided as one control signal.

The backlight driver 500 may perform the method of driving the LED backlight unit according to some example embodiments described with reference to FIGS. 1 through 3. For example, the backlight driver 500 may generate a plurality of gate signals applied to the plurality of gate lines, may generate a non-overlap interval during which all of the plurality of gate signals are deactivated between activation intervals of two adjacent gate signals while the plurality of gate signals are generated, may generate a plurality of source signals applied to the plurality of source lines, and may generate a high-impedance interval during which at least some of the plurality of source signals have a high-impedance state and included in the non-overlap interval while the plurality of source signals are generated.

Example configurations of the backlight driver 500 and the LED backlight unit 600 will be described with reference to FIGS. 6 and 7.

The display panel 400 may include a plurality of display pixels DPX that are arranged in a matrix formation having a plurality of rows and a plurality of columns. For example, as will be described with reference to FIG. 5, the plurality of display pixels DPX may be connected to a plurality of scan lines and a plurality of data lines.

The display driver 300 may drive the display panel 400. For example, the display driver 300 may generate a plurality of data voltages DTV and a plurality of scan signals SCS for driving the plurality of display pixels DPX based on display driving data DPDAT and a display control signal DCONT that are provided from the timing controller 220. For example, the display driving data DPDAT may include red image data, green image data and blue image data. In addition, the display driving data DPDAT may further include white image data. Alternatively, the display driving data DPDAT may include magenta image data, yellow image data, cyan image data, or the like.

Example configurations of the display driver 300 and the display panel 400 will be described with reference to FIG. 5.

The display panel 400 and the LED backlight unit 600 may form a panel included in the display device 100, and the display device 100 may display an image through the panel. For example, the LED backlight unit 600 may generate light, and the display panel 400 may be disposed on the LED backlight unit 600 and may display the image based on the light provided from the LED backlight unit 600.

The system-on-chip 200 may control overall operations of the display device 100, the timing controller 220 may control operations of the display driver 300 and the display panel 400, and the backlight controller 240 may control operations of the backlight driver 500 and the LED backlight unit 600. For example, the system-on-chip 200 may generate control signals CONT1 and CONT2 based on a control of an external host device, and may provide the control signals CONT1 and CONT2 to the timing controller 220 and the backlight controller 240, respectively. For example, the timing controller 220 may generate the display driving data DPDAT and the display control signal DCONT, and may provide the display driving data DPDAT and the display control signal DCONT to the display driver 300. For example, the backlight controller 240 may generate the backlight driving data BLDAT and the backlight control signal BCONT, and may provide the backlight driving data BLDAT and the backlight control signal BCONT to the backlight driver 500. Thus, the operations of the display device 100 may be controlled by the system-on-chip 200, the timing controller 220 and the backlight controller 240. For example, the control signals CONT1, CONT2, DCONT and BCONT may include a vertical synchronization signal and a horizontal synchronization signal that are used inside the display device 100.

In some example embodiments, the system-on-chip 200, the timing controller 220, the backlight controller 240, the display driver 300 and the backlight driver 500 may be implemented as one integrated circuit. In other example embodiments, the system-on-chip 200, the timing controller 220, the backlight controller 240, the display driver 300 and the backlight driver 500 may be implemented as two or more integrated circuits.

Figure 5:
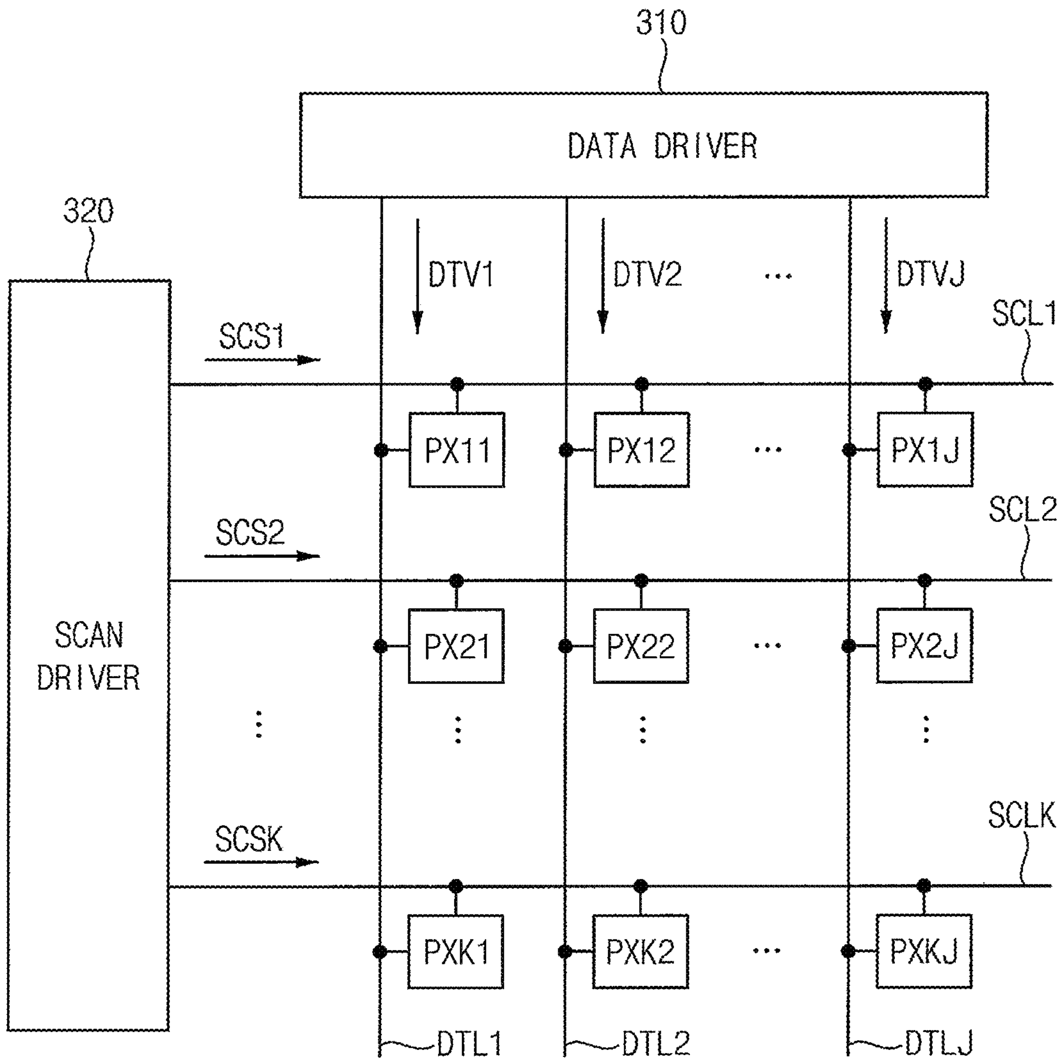
FIG. 5 is a block diagram illustrating an example of a display driver and a display panel that are included in a display device of FIG. 4 according to some example embodiments.

FIG. 5 is a block diagram illustrating an example of a display driver and a display panel that are included in a display device of FIG. 4 according to some example embodiments.

Referring to FIGS. 4 and 5, the display driver 300 may include a data driver 310 and a scan driver 320. The display panel 400 may include a plurality of display pixels PX11, PX12, . . . , PX1J, PX21, PX22, . . . , PX2J, . . . , PXK1, PXK2, . . . , PXKJ.

The display panel 400 may be connected to the data driver 310 through a plurality of data lines DTL1, DTL2, . . . , DTLJ, and may be connected to the scan driver 320 through a plurality of scan lines SCL1, SCL2, . . . , SCLK. For example, the plurality of data lines DTL1 to DTLJ may include first to J-th data lines, where J is a natural number greater than or equal to two. For example, the plurality of scan lines SCL1 to SCLK may include first to K-th data lines, where K is a natural number greater than or equal to two. The plurality of data lines DTL1 to DTLJ may extend in a first direction, and the plurality of scan lines SCL1 to SCLK may extend in a second direction crossing (e.g., substantially perpendicular to) the first direction.

Each of the plurality of display pixels PX11 to PX1J, PX21 to PX2J, and PXK1 to PXKJ may be electrically connected to a respective one of the plurality of data lines DTL1 to DTLJ and a respective one of the plurality of scan lines SCL1 to SCLK. For example, the display pixel PX11 may be electrically connected to the data line DTL1 and the scan line SCLK. For example, each of the plurality of display pixels PX11 to PX1J, PX21 to PX2J, and PXK1 to PXKJ may include a liquid crystal (LC) capacitor and at least one driving transistor.

The data driver 310 may generate a plurality of data voltages DTV1, DTV2, . . . , DTVJ based on the display driving data DPDAT and the display control signal DCONT, and may apply the plurality of data voltages DTV1 to DTVJ to the plurality of display pixels PX11 to PX1J, PX21 to PX2J, and PXK1 to PXKJ through the plurality of data lines DTL1 to DTLJ. For example, the plurality of data voltages DTV1 to DTVJ may include first to J-th data voltages. For example, the display pixel PX11 may receive the data voltage DTV1 through the data line DTL1. For example, the data driver 310 may include a digital-to-analog converter (DAC) that converts the display driving data DPDAT in a digital form into the plurality of data voltages DTV1 to DTVJ in an analog form.

The scan driver 320 may generate a plurality of scan signals SCS1, SCS2, . . . , SCSK based on the display control signal DCONT, and may apply the plurality of scan signals SCS1 to SCSK to the plurality of display pixels PX11 to PX1J, PX21 to PX2J, and PXK1 to PXKJ through the plurality of scan lines SCL1 to SCLK. For example, the plurality of scan signals SCS1 to SCSK may include first to K-th scan signals. For example, the display pixel PX11 may receive the scan signal SCS1 through the scan line SCL1. The plurality of scan lines SCL1 to SCLK may be sequentially activated based on the plurality of scan signals SCS1 to SCSK.

In some example embodiments, at least some of the elements included in the data driver 310 and/or the scan driver 320 may be disposed, e.g., directly mounted, on the display panel 400, or may be connected to the display panel 400 in a tape carrier package (TCP) type. Alternatively, at least some of the elements included in the data driver 310 and/or the scan driver 320 may be integrated on the display panel 400. In some example embodiments, the elements included in the data driver 310 and/or the scan driver 320 may be respectively implemented with separate circuits/modules/chips. In other example embodiments, on the basis of a function, some of the elements included in the data driver 310 and/or the scan driver 320 may be combined into one circuit/module/chip, or may be further separated into a plurality of circuits/modules/chips.

Figure 6:
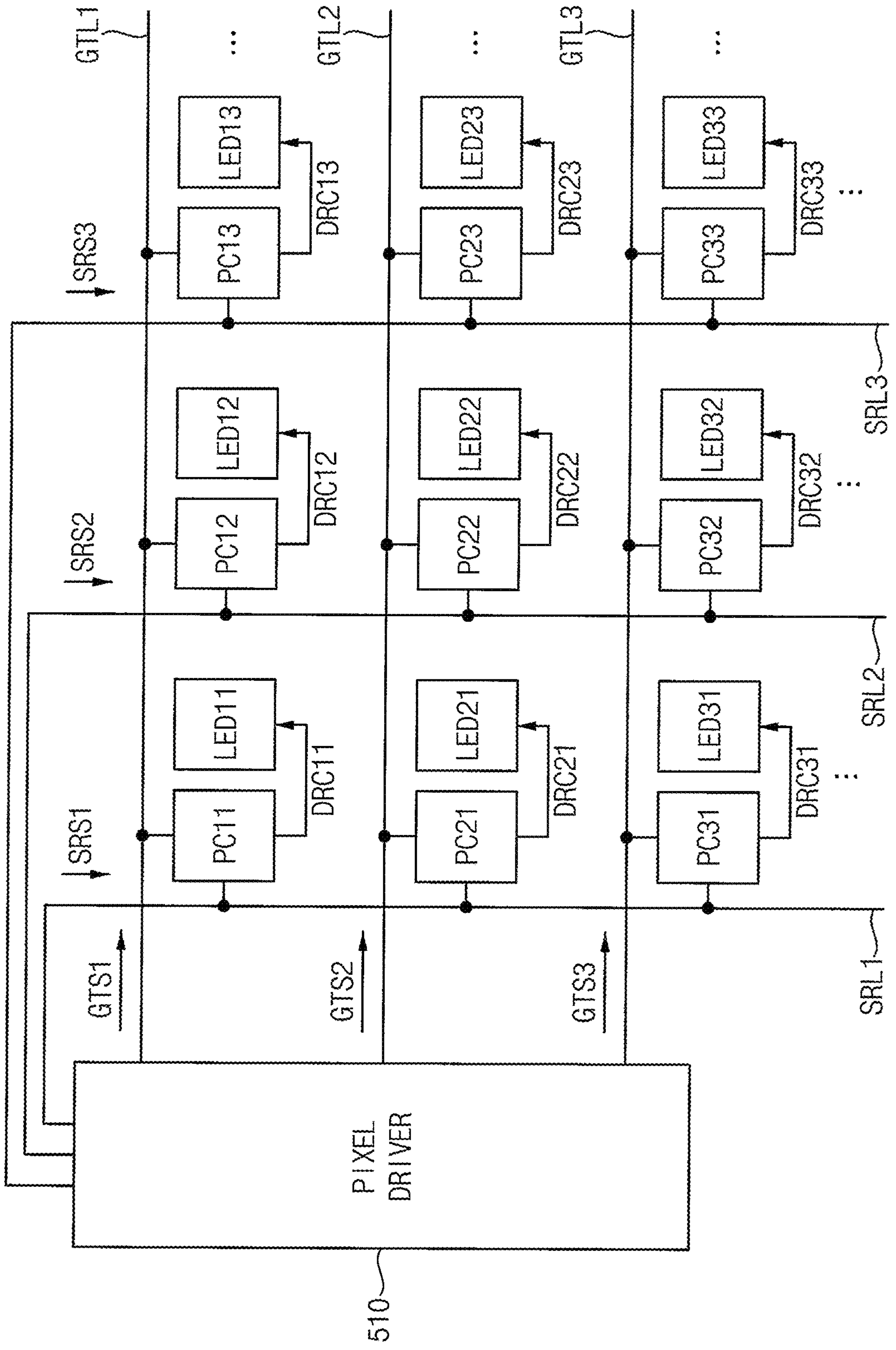
FIG. 6 is a block diagram illustrating an example of a backlight driver and an LED backlight unit that are included in a display device of FIG. 4 according to some example embodiments.

FIG. 6 is a block diagram illustrating an example of a backlight driver and an LED backlight unit that are included in a display device of FIG. 4 according to some example embodiments.

Referring to FIGS. 4 and 6, the backlight driver 500 may include a pixel driver 510 and a plurality of pixel circuits PC11, PC12, PC13, . . . , PC21, PC22, PC23, . . . , PC31, PC32, PC33, . . . . The LED backlight unit 600 may include a plurality of LED elements LED11, LED12, LED13, . . . , LED21, LED22, LED23, . . . , LED31, LED32, LED33, . . . .

The LED backlight unit 600 may be connected to the pixel driver 510 through a plurality of source lines SRL1, SRL2, SRL3, . . . , a plurality of gate lines GTL1, GTL2, GTL3, . . . , and a plurality of pixel circuits PC11 to PC13, PC21 to PC23, and PC31 to PC33. For convenience of illustration, only three source lines SRL1 to SRL3 and three gate lines GTL1 to GTL3 are illustrated in FIG. 6, example embodiments are not limited thereto. For example, the plurality of source lines SRL1 to SRL3 may include first to M-th source lines, and the plurality of gate lines GTL1 to GTL3 may include first to N-th source lines, where each of M and N is a natural number greater than or equal to two. The plurality of source lines SRL1 to SRL3 may extend in the first direction, and the plurality of gate lines GTL1 to GTL3 may extend in the second direction crossing the first direction. For example, the plurality of source lines SRL1 to SRL3 may extend in the first direction such that the plurality of source lines SRL1 to SRL3 are parallel with the plurality of data lines DTL1 to DTLJ in FIG. 5, and the plurality of gate lines GTL1 to GTL3 may extend in the second direction such that the plurality of gate lines GTL1 to GTL3 are parallel with the plurality of scan lines SCL1 to SCLK in FIG. 5.

Each of the plurality of LED elements LED11 to LED13, LED21 to LED23, and LED31 to LED33 may be electrically connected to a respective one of the plurality of source lines SRL1 to SRL3 and a respective one of the plurality of gate lines GTL1 to GTL3 through a respective one of the plurality of pixel circuits PC11 to PC13, PC21 to PC23, or PC31 to PC33. For example, the LED element LED11 may be electrically connected to the source line SRL1 and the gate line GTL1 through the pixel circuit PC11. For example, each of the plurality of LED elements LED11 to LED13, LED21 to LED23, and LED31 to LED33 may include one LED or two or more LEDs connected in series.

In some example embodiments, the number of the plurality of source lines SRL1 to SRL3, the number of the plurality of gate lines GTL1 to GTL3, and the number of the plurality of LED elements LED11 to LED13, LED21 to LED23, and LED31 to LED33 may be less than the number of the plurality of data lines DTL1 to DTLJ in FIG. 5, the number of the plurality of scan lines SCL1 to SCLK in FIG. 5, and the number of the plurality of display pixels PX11 to PX1J, PX21 to PX2J, and PXK1 to PXKJ in FIG. 5, respectively. For example, M<J when the number of source lines and the number of data lines are M and J, respectively, and N<K when the number of gate lines and the number of scan lines are N and K, respectively. In this case, one LED element may correspond to two or more display pixels and may be used to drive two or more display pixels. For example, when M=J/2 and N=K/2, one LED element may correspond to four display pixels and may be used to drive four display pixels.

The pixel driver 510 may generate a plurality of source signals SRS1, SRS2, SRS3, . . . , and a plurality of gate signals GTS1, GTS2, GTS3, . . . based on the backlight driving data BLDAT and the backlight control signal BCONT, and may provide the plurality of source signals SRS1 to SRS3 and the plurality of gate signals GTS1 to GTS3 through the plurality of source lines SRL1 to SRL3 and the plurality of gate lines GTL1 to GTL3, respectively. For convenience of illustration, only three source signals SRS1 to SRS3 and three gate signals GTS1 to GTS3 are illustrated in FIG. 6, example embodiments are not limited thereto. For example, the plurality of source signals SRS1 to SRS3 may include first to M-th source signals, and the plurality of gate signals GTS1 to GTS3 may include first to N-th source signals. For example, the source signal SRS1 and the gate signal GTS1 may be provided to the pixel circuit PC11 through the source line SRL1 and the gate line GTL1, respectively.

The plurality of pixel circuits PC11 to PC13, PC21 to PC23, and PC31 to PC33 may generate a plurality of driving currents DRC11, DRC12, DRC13, . . . , DRC21, DRC22, DRC23, . . . , DRC31, DRC32, DRC33, . . . based on the plurality of source signals SRS1 to SRS3 and the plurality of gate signals GTS1 to GTS3, and may provide the plurality of driving currents DRC11 to DRC13, DRC21 to DRC23, and DRC31 to DRC33 to the plurality of LED elements LED11 to LED13, LED21 to LED23, and LED31 to LED33. For example, the pixel circuit PC11 may generate the driving current DRC11 based on the source signal SRS1 and the gate signal GTS1, and may provide the driving current DRC11 to the LED element LED11.

In some example embodiments, the plurality of LED elements LED11 to LED13, LED21 to LED23, and LED31 to LED33 may emit light based on the current driving scheme, e.g., based on the plurality of driving currents DRC11 to DRC13, DRC21 to DRC23, and DRC31 to DRC33. For example, the intensity (e.g., brightness or luminance) of light generated by the plurality of LED elements LED11 to LED13, LED21 to LED23, and LED31 to LED33 may be determined based on the amount (or current level) of the plurality of driving currents DRC11 to DRC13, DRC21 to DRC23, and DRC31 to DRC33. For example, the LED element LED11 may emit light based on the driving current DRC11. For example, as the amount of the driving current DRC11 increases, the brightness or luminance of the LED element LED11 may increase.

In some example embodiments, the plurality of LED elements LED11 to LED13, LED21 to LED23, and LED31 to LED33 may be driven based on the active matrix scheme. The active matrix scheme represents a driving scheme in which each of the LED elements LED11 to LED13, LED21 to LED23, and LED31 to LED33 is driven using (or during) the entire one frame interval during which t one frame image is displayed. For example, during one frame interval, the LED elements LED11 to LED13 connected to the gate line GTL1 may emit light from a time point at which the gate signal GTS1 is activated to an ending time point of the frame interval, and may continue to emit light until data corresponding to the gate line GTL1 of a next frame interval is input. Similarly, the LED elements LED21 to LED23 connected to the gate line GTL2 may emit light from a time point at which the gate signal GTS2 is activated to the ending time point of the frame interval, and may continue to emit light until data corresponding to the gate line GTL2 of the next frame interval is input. The LED elements LED31 to LED33 connected to the gate line GTL3 may emit light from a time point at which the gate signal GTS3 is activated to the ending time point of the frame interval, and may continue to emit light until data corresponding to the gate line GTL3 of the next frame interval is input.

In some example embodiments, the plurality of LED elements LED11 to LED13, LED21 to LED23, and LED31 to LED33 may be driven based on a local dimming scheme. The local dimming scheme represents a driving scheme in which the brightness or luminance of the plurality of LED elements LED11 to LED13, LED21 to LED23, and LED31 to LED33 are differently controlled for each area (or region).

Although FIG. 6 illustrates an example where the number of the pixel circuits PC11 to PC13, PC21 to PC23, and PC31 to PC33 and the number of the LED elements LED11 to LED13, LED21 to LED23, and LED31 to LED33 are the same, e.g., an example where one pixel circuit drives one LED element, example embodiments are not limited thereto. For example, the number of pixel circuits may be less than the number of LED elements, one pixel circuit may be shared by two or more LED elements, and one pixel circuit may drive two or more LED elements.

Although FIG. 5 illustrates that lines connecting the data driver 310 with the display panel 400 and extending in the first direction are defined as the data lines, and although FIG. 6 illustrates that lines extending in the first direction are defined as the source lines, example embodiments are not limited thereto. For example, the data lines in FIG. 5 may also be defined as source lines, or the source lines in FIG. 6 may also be defined as data lines. In this case, the data lines (or source lines) in FIG. 5 may be referred to as display data lines (or display source lines), and the data lines (or source lines) in FIG. 6 may be referred to as backlight data lines (or backlight source lines).

Similarly, although FIG. 5 illustrates that lines connecting the scan driver 320 with the display panel 400 and extending in the second direction are defined as the scan lines, and although FIG. 6 illustrates that lines extending in the second direction are defined as the gate lines, example embodiments are not limited thereto. For example, the scan lines in FIG. 5 may also be defined as gate lines, or the gate lines in FIG. 6 may also be defined as scan lines. In this case, the scan lines (or gate lines) in FIG. 5 may be referred to as display scan lines (or display gate lines), and the scan lines (or gate lines) in FIG. 6 may be referred to as backlight scan lines (or backlight gate lines).

Figure 7:
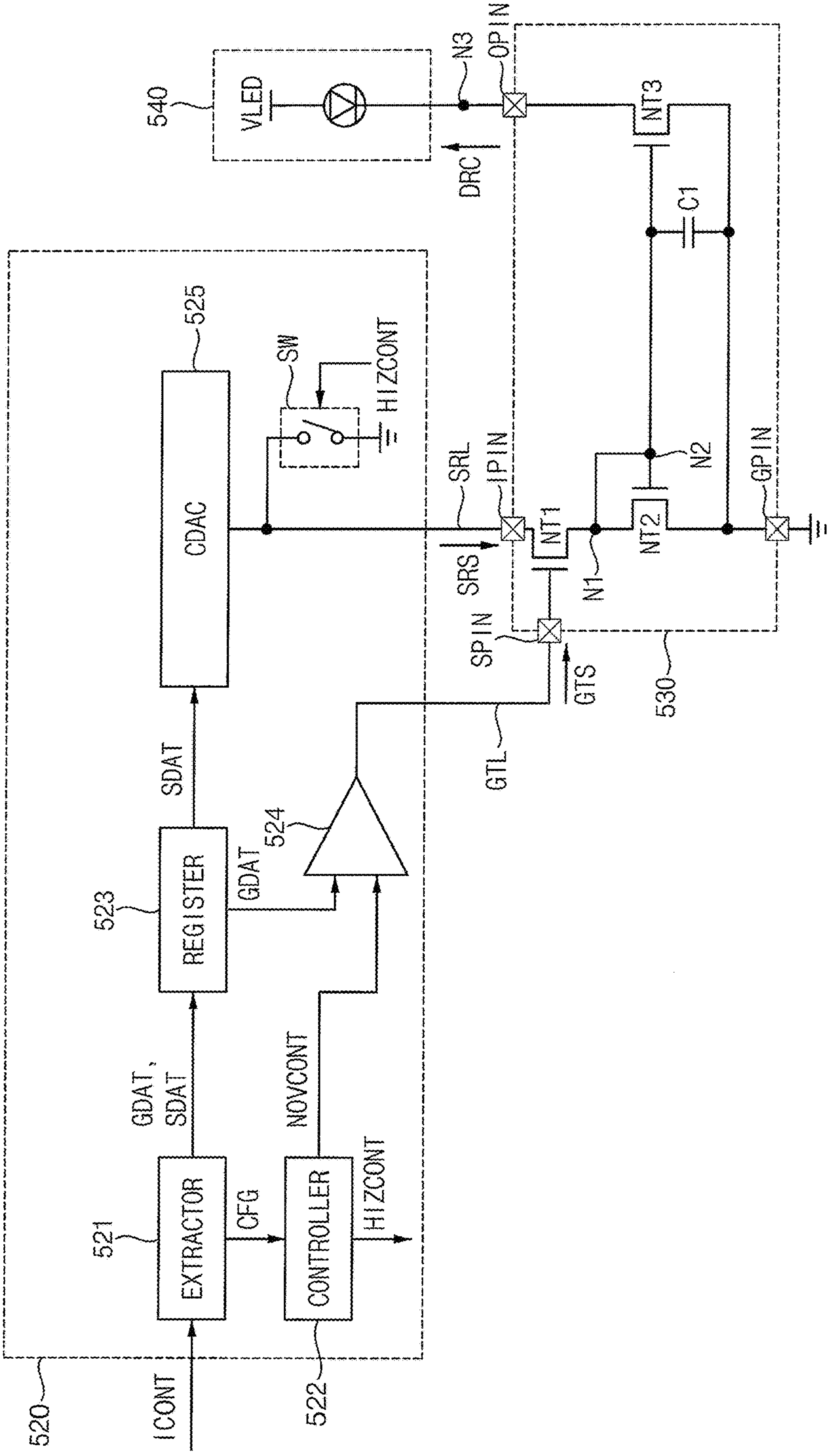
FIG. 7 is a diagram illustrating an example of a pixel driver, a pixel circuit and an LED element in FIG. 6 according to some example embodiments.

FIG. 7 is a diagram illustrating an example of a pixel driver, a pixel circuit and an LED element in FIG. 6 according to some example embodiments. For convenience of illustration, FIG. 7 illustrates only one pixel circuit and one LED element.

Referring to FIG. 7, a backlight driver 500 may include one or more of a pixel driver 520 (which may correspond to the pixel driver 510 shown in FIG. 6), and a pixel circuit 530 (which may correspond to one or more of a plurality of pixel circuits PC11 to PC13, PC21 to PC23, and PC31 to PC33 shown in FIG. 6), and an LED backlight unit 600 may include an LED element 540 (which may correspond to one or more of a plurality of LED elements including at least one of LED11 to LED33 shown in FIG. 6). In some example embodiments, a pixel driver 520 may generate a gate signal GTS and a source signal SRS that are provided to a pixel circuit 530 based on an input control signal ICONT. For example, the input control signal ICONT may include the backlight driving data BLDAT and the backlight control signal BCONT in FIG. 4.

The pixel driver 520 may include an extractor 521, a controller 522, a register 523, a buffer 524, a current digital-to-analog converter (CDAC) 525 and a switch SW. For example, the pixel driver 520 may be implemented as a single integrated circuit (IC) or chip.

The extractor 521 may extract a configuration signal (or environment setting signal) CFG, a gate data signal GDAT and a source data signal SDAT based on the input control signal ICONT. The extractor 521 may additionally extract a gate mode.

The controller 522 may determine a gate output timing, a gate non-overlap timing, a source output timing and a source high-impedance timing based on the configuration signal CFG, and may generate a non-overlap control signal NOVCONT corresponding to the gate output timing and the gate non-overlap timing, and may generate a high-impedance control signal HIZCONT corresponding to the source output timing and the source high-impedance timing.

The register 523 may store and output the gate data signal GDAT and the source data signal SDAT. In other words, the register 523 may be set based on the gate data signal GDAT and the source data signal SDAT.

The buffer 524 may generate the gate signal GTS based on the gate data signal GDAT and the non-overlap control signal NOVCONT. For example, the gate signal GTS may be activated or deactivated based on the gate output timing and the gate data signal GDAT, and the buffer 524 may output the gate signal GTS that is activated or deactivated based on the gate output timing and the gate data signal GDAT. For example, the gate signal GTS may be deactivated based on the gate non-overlap timing, and the buffer 524 may output the gate signal GTS that is deactivated based on the gate non-overlap timing. The gate signal GTS may be output through a gate line GTL.

The current digital-to-analog converter 525 may generate the source signal SRS based on the source output timing and the source data signal SDAT. For example, when the source data signal SDAT is 10-bit digital data, the source signal SRS may be an analog signal (e.g., a current signal) having 1024 ($=2^{10}$) different values. The source signal SRS may be output through a source line SRL. For example, the current digital-to-analog converter 525 may include a plurality of transistors and a decoder.

The switch SW may be connected between an output of the current digital-to-analog converter 525 and a ground voltage, and may be turned on and off based on the source high-impedance timing (e.g., based on the high-impedance control signal HIZCONT). For example, when the high-impedance control signal HIZCONT is activated, the switch SW may be closed, and a current path may be formed between the source line SRL and the ground voltage, and the source signal SRS may have a high-impedance state based on the current path. In other words, the switch SW may operate as a high-impedance controller that controls a level of the source signal SRS to have the high-impedance state based on the high-impedance control signal HIZCONT.

Although FIG. 7 illustrates one buffer 524 that generates one gate signal GTS, one current digital-to-analog converter 525 that generates one source signal SRS, and one switch SW that is connected to one current digital-to-analog converter 525, example embodiments are not limited thereto. For example, the number of buffers may be equal to the number of gate signals, and the number of current digital-to-analog converters and the number of switches may be equal to the number of source signals.

In some example embodiments, at least a part or all of the components included in the pixel driver 520 may be implemented as hardware. For example, at least a part or all of the components included in the pixel driver 520 may be included in a computer-based electronic system. However, example embodiments are not limited thereto, and at least a part or all of the components included in the pixel driver 520 may be implemented as instruction codes or program routines (e.g., a software program). For example, the instruction codes or the program routines may be executed by a computer-based electronic system, and may be stored in any storage device located inside or outside the computer-based electronic system.

As described above, the pixel driver 520 implemented as a single integrated circuit or chip may simultaneously control the non-overlap interval of the gate signal GTS and the high-impedance interval (or source-impedance interval) of the source signal SRS, and the non-overlap interval and the high-impedance interval may be adjusted by setting the resistor (or internal register) 523 based on the input control signal ICONT received from the outside.

The pixel circuit 530 may generate a driving current DRC provided to an LED element 540 based on the gate signal GTS and the source signal SRS. For example, the pixel circuit 530 may be selected based on the gate signal GTS, and then, the driving current DRC may be applied to the LED element 540 by amplifying the current based on the source signal SRS.

The pixel circuit 530 may include a selection pin SPIN, an input pin IPIN, an output pin OPIN, a ground pin GPIN transistors NT1, NT2 and NT3, and a capacitor C1. For example, the transistors NT1 to NT3 may be n-type metal oxide semiconductor (NMOS) transistors.

The selection pin SPIN may receive the gate signal GTS, the input pin IPIN may receive the source signal SRS, the output pin OPIN may output the driving current DRC, and the ground pin GPIN may be connected to the ground voltage.

The transistors NT1 may be connected between the source line SRL and a node N1 (e.g., between the input pin IPIN and the node N1), and may include a gate electrode connected to the gate line GTL (e.g., the selection pin SPIN). The transistors NT2 may be connected between the node N1 and the ground voltage (e.g., between the node N1 and the ground pin GPIN), and may include a gate electrode connected to a node N2. The transistors NT3 may be connected between a node N3 and the ground voltage (e.g., between the output pin OPIN and the ground pin GPIN), and may include a gate electrode connected to the node N2. The capacitor C1 may be connected between the node N2 and the ground voltage (e.g., between the node N2 and the ground pin GPIN). The driving current DRC may be output through the node N3.

The LED element 540 may include an LED connected between a LED driving voltage VLED and a node N5. The LED may emit light based on the driving current DRC. Although FIG. 7 illustrates one LED, example embodiments are not limited thereto. For example, the LED element 540 may include two or more LEDs that are connected in series and/or in parallel between the LED driving voltage VLED and the node N5.

Figure 8:
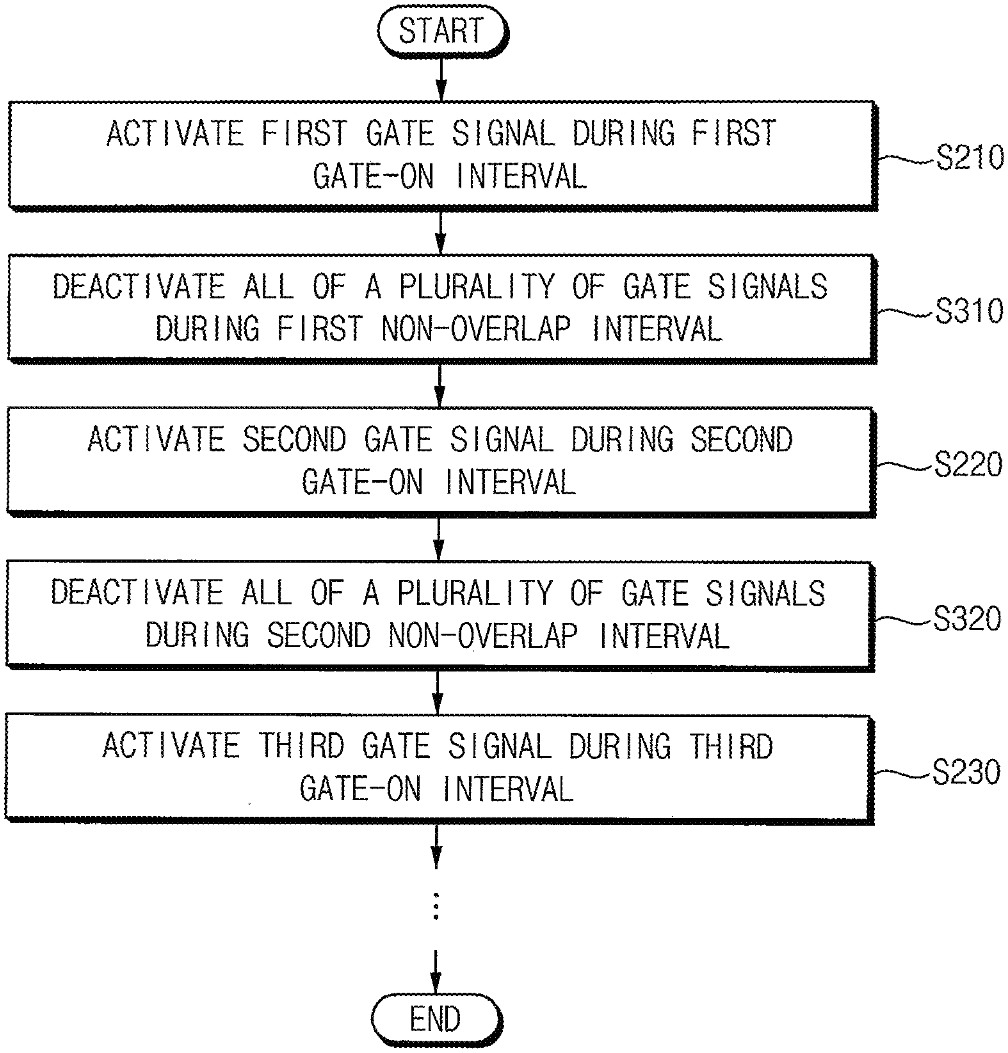
FIG. 8 is a flowchart illustrating an example of generating a plurality of gate signals and generating a non-overlap interval in FIG. 2 according to some example embodiments.

FIG. 8 is a flowchart illustrating an example of generating a plurality of gate signals and generating a non-overlap interval in FIG. 2 according to some example embodiments.

Referring to FIGS. 2, 6 and 8, when generating the plurality of gate signals (step S200), during a first gate-on interval, the first gate signal GTS1 applied to the first gate line GTL1 may be activated (step S210). While the first gate signal GTS1 is activated, the gate signals GTS2 and GTS3 other than the first gate signal GTS1 may be deactivated.

When generating the non-overlap interval (step S300), during a first non-overlap interval after (or subsequent to) the first gate-on interval (e.g., during the first non-overlap interval between the first gate-on interval and a second gate-on interval), all of the plurality of gate signals GTS1 to GTS3 may be deactivated (step S310).

When generating the plurality of gate signals (step S200), during the second gate-on interval after the first gate-on interval (e.g., during the second gate-on interval after the first non-overlap interval), the second gate signal GTS2 applied to the second gate line GTL2 may be activated (step S220). While the second gate signal GTS2 is activated, the gate signals GTS1 and GTS3 other than the second gate signal GTS2 may be deactivated.

When generating the non-overlap interval (step S300), during a second non-overlap interval after the second gate-on interval (e.g., during the second non-overlap interval between the second gate-on interval and a third-on interval), all of the plurality of gate signals GTS1 to GTS3 may be deactivated (step S320).

When generating the plurality of gate signals (step S200), during the third gate-on interval after the second gate-on interval (e.g., during the third gate-on interval after the second non-overlap interval), the third gate signal GTS3 applied to the third gate line GTL3 may be activated (step S230). While the third gate signal GTS3 is activated, the gate signals GTS1 and GTS2 other than the third gate signal GTS3 may be deactivated.

Although not illustrated in FIG. 8, a non-overlap interval during which all of the plurality of gate signals are deactivated may be added even before step S210.

In addition, although not illustrated in FIG. 8, an operation of deactivating all of the plurality of gate signals during the non-overlap interval and an operation of activating one gate signal during the gate-on interval may be alternately repeated after step S230. For example, when the plurality of gate lines and the plurality of gate signals include the first to N-th gate lines and the first to N-th gate signals, first to N-th gate-on intervals for activating the first to N-th gate signals and first to (N−1)-th non-overlap intervals for deactivating all of the first to N-th gate signals may be sequentially and alternatively generated.

Figure 9:
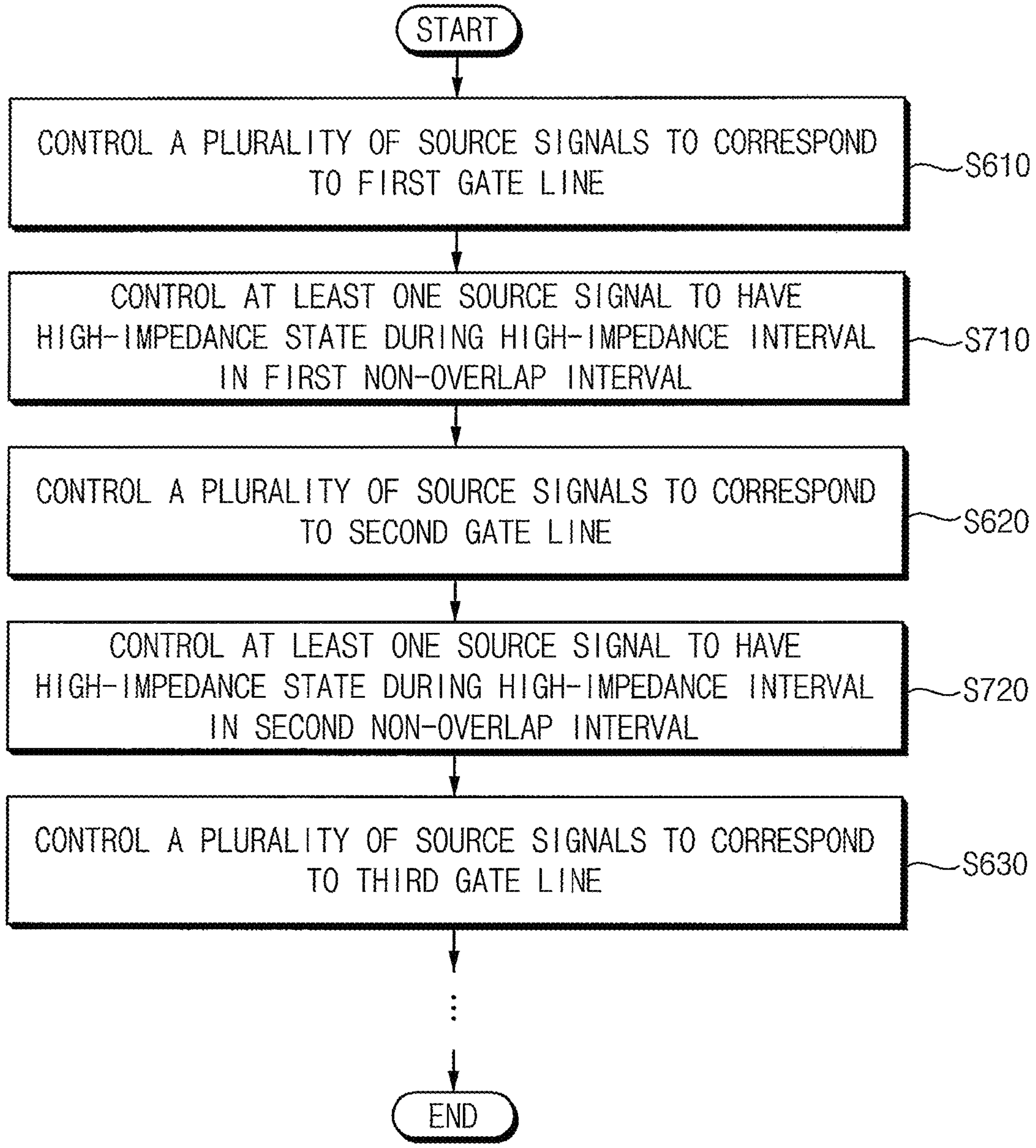
FIG. 9 is a flowchart illustrating an example of generating a plurality of source signals and generating a high-impedance interval in FIG. 3 according to some example embodiments.

FIG. 9 is a flowchart illustrating an example of generating a plurality of source signals and generating a high-impedance interval in FIG. 3 according to some example embodiments.

Referring to FIGS. 3, 6 and 9, when generating the plurality of source signals (step S600), the plurality of source signals SRS1 to SRS3 may be controlled to correspond to the first gate line GTL1 (step S610). For example, during the first gate-on interval during which the first gate signal GTS1 is activated, the plurality of source signals SRS1 to SRS3 may be controlled and output such that the plurality of source signals SRS1 to SRS3 have values for generating (e.g., to cause generation of) the driving currents DRC11 to DRC13 that are supplied to the LED elements LED11 to LED13 connected to the first gate line GTL1.

When generating the high-impedance interval (step S700), during a first high-impedance interval included in the first non-overlap interval, at least one of the plurality of source signals SRS1 to SRS3 may be controlled such that at least one of the plurality of source signals SRS1 to SRS3 has the high-impedance state (step S710).

In some example embodiments, at least one of a starting time point, an ending time point, or a length of the first high-impedance interval may be changeable, which will be described with reference to FIGS. 10B and 10C.

When generating the plurality of source signals (step S600), the plurality of source signals SRS1 to SRS3 may be controlled to correspond to the second gate line GTL2 (step S620). For example, during the second gate-on interval during which the second gate signal GTS2 is activated, the plurality of source signals SRS1 to SRS3 may be controlled and output such that the plurality of source signals SRS1 to SRS3 have values for generating (e.g., to cause generation of) the driving currents DRC21 to DRC23 that are supplied to the LED elements LED21 to LED23 connected to the second gate line GTL2.

When generating the high-impedance interval (step S700), during a second high-impedance interval included in the second non-overlap interval, at least one of the plurality of source signals SRS1 to SRS3 may be controlled such that at least one of the plurality of source signals SRS1 to SRS3 has the high-impedance state (step S720).

When generating the plurality of source signals (step S600), the plurality of source signals SRS1 to SRS3 may be controlled to correspond to the third gate line GTL3 (step S630). For example, during the third gate-on interval during which the third gate signal GTS3 is activated, the plurality of source signals SRS1 to SRS3 may be controlled and output such that the plurality of source signals SRS1 to SRS3 have values for generating the driving currents DRC31 to DRC33 that are supplied to the LED elements LED31 to LED33 connected to the third gate line GTL3.

Although not illustrated in FIG. 9, an operation of controlling at least one source signal to have the high-impedance state during the high-impedance interval included in the non-overlap interval and an operation of controlling the plurality of source signals during the gate-on interval may be alternately repeated after step S630. For example, when the plurality of gate lines and the plurality of gate signals include the first to N-th gate lines and the first to N-th gate signals, operations of controlling and outputting the plurality of source signals to correspond to the first to N-th gate lines and first to (N−1)-th high-impedance intervals for controlling at least one source signal to have the high-impedance state may be sequentially and alternatively generated.

FIGS. 10A, 10B, 10C, 10D, 11A and 11B are diagrams for describing operations of FIGS. 8 and 9 according to some example embodiments.

Figure 10A:
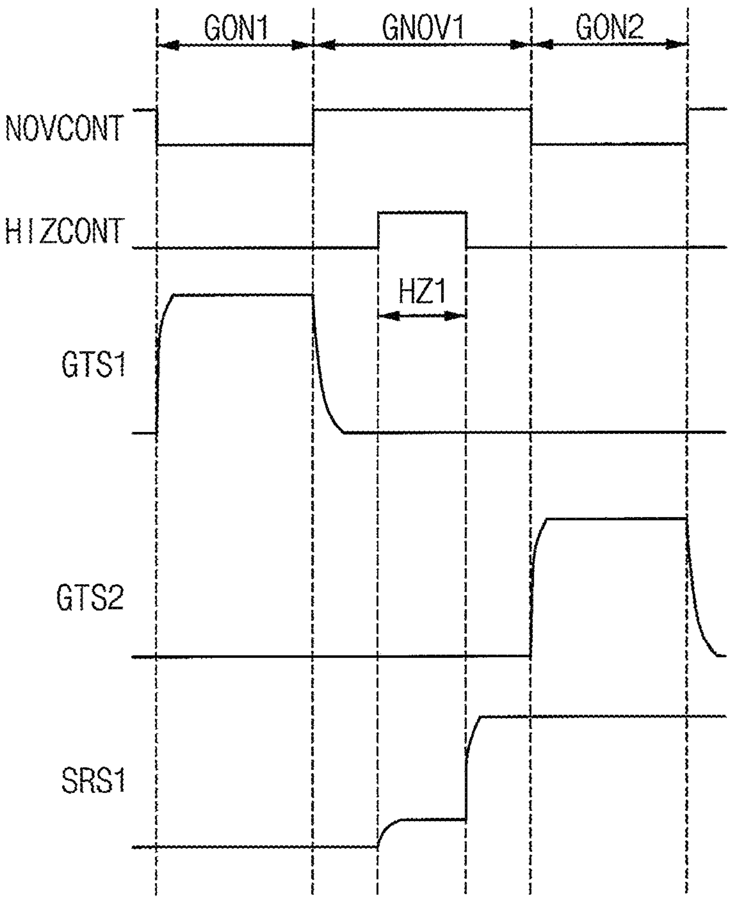
FIGS. 10A, 10B, 10C, 10D, 11A and 11B are diagrams for describing operations of FIGS. 8 and 9 according to some example embodiments.

Referring to FIG. 10A, an example of steps S210, S531 and S220 in FIG. 8 and steps S610, S710 and S620 in FIG. 9 is illustrated.

The non-overlap control signal NOVCONT may be deactivated during a first gate-on interval GON1 and a second gate-on interval GON2, and may be activated during a first non-overlap interval GNOV1. The first gate signal GTS1 may be activated only during the first gate-on interval GON1, and the second gate signal GTS2 may be activated only during the second gate-on interval GON2.

The high-impedance control signal HIZCONT may be activated only during a first high-impedance interval HZ1, and may be deactivated during the remaining intervals. The first source signal SRS1 may have a first value for generating the driving current DRC11 supplied to the LED element LED11 during the first gate-on interval GON1, and may have a second value for generating the driving current DRC21 supplied to the LED element LED21 during the second gate-on interval GON2. For example, the second value may be greater than the first value, and the second brightness of the LED element LED21 may be greater than the first brightness of the LED element LED11. In addition, the first source signal SRS1 may have a first high-impedance state during the first high-impedance interval HZ1. For example, during the first high-impedance interval HZ1, the switch SW may be closed based on the high-impedance control signal HIZCONT. For example, a value corresponding to the first high-impedance state may be determined based on the first and second values, and may have an arbitrary value (e.g., a value between the first and second values). For example, the value corresponding to the first high-impedance state may not be a fixed value, and may vary when at least one of the first or second values is changed. For example, when the pixel circuit 530 is not selected (e.g., when the selection pin SPIN is at a low level), a current path may not exist, and a voltage level of the first source signal SRS1 may increase or decrease. In this case, a current path may be formed by the switch SW in the pixel driver 520 such that a change in the voltage level of the first source signal SRS1 may be prevented or the voltage level of the first source signal SRS1 may be maintained constantly.

In some example embodiments, the first source signal SRS1 may not have the second value in synchronization with a starting time point of the second gate-on interval GON2, and may have the second value in synchronization with an ending time point of the first high-impedance interval HZ1. For example, an output timing of the first source signal SRS1 may be determined based on the input control signal ICONT, and the first source signal SRS1 may be controlled based on the high-impedance control signal HIZCONT when the output timing is within the first high-impedance interval HZ1. In this case, the first source signal SRS1 may be stabilized quickly and may already maintain the second value at the starting time point of the second gate-on interval GON2, and thus the LED element LED21 may emit light with a desired brightness based on the stabilized first source signal SRS1.

Figure 10B:
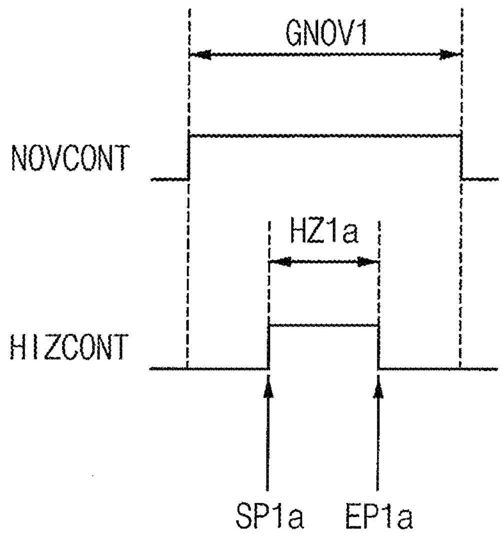
Figure 10C:
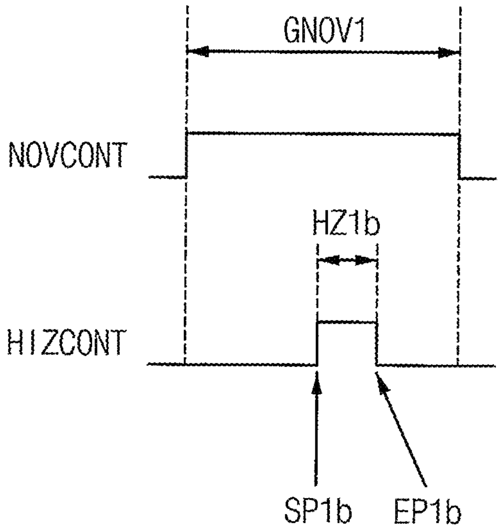

Referring to FIGS. 10B and 10C, an example where at least one of a starting time point, an ending time point, or a length of the first high-impedance interval HZ1 included in the first non-overlap interval GNOV1 is changeable is illustrated.

For example, as illustrated in FIG. 10B, a first high-impedance interval HZ1*a* may start at a time point SP1*a* and may end at a time point EP1*a*, and may have a length corresponding to a time difference between the time point SP1*a* and the time point EP1*a*. For example, as illustrated in FIG. 10C, a first high impedance section HZ1*b* may start at a time point SP1*b* and may end at a time point EP1*b*, and may have a length corresponding to a time difference between the time point SP1*b* and the time point EP1*b*. In this way, the high-impedance interval may be set and adjusted in a user-desired manner.

Figure 10D:
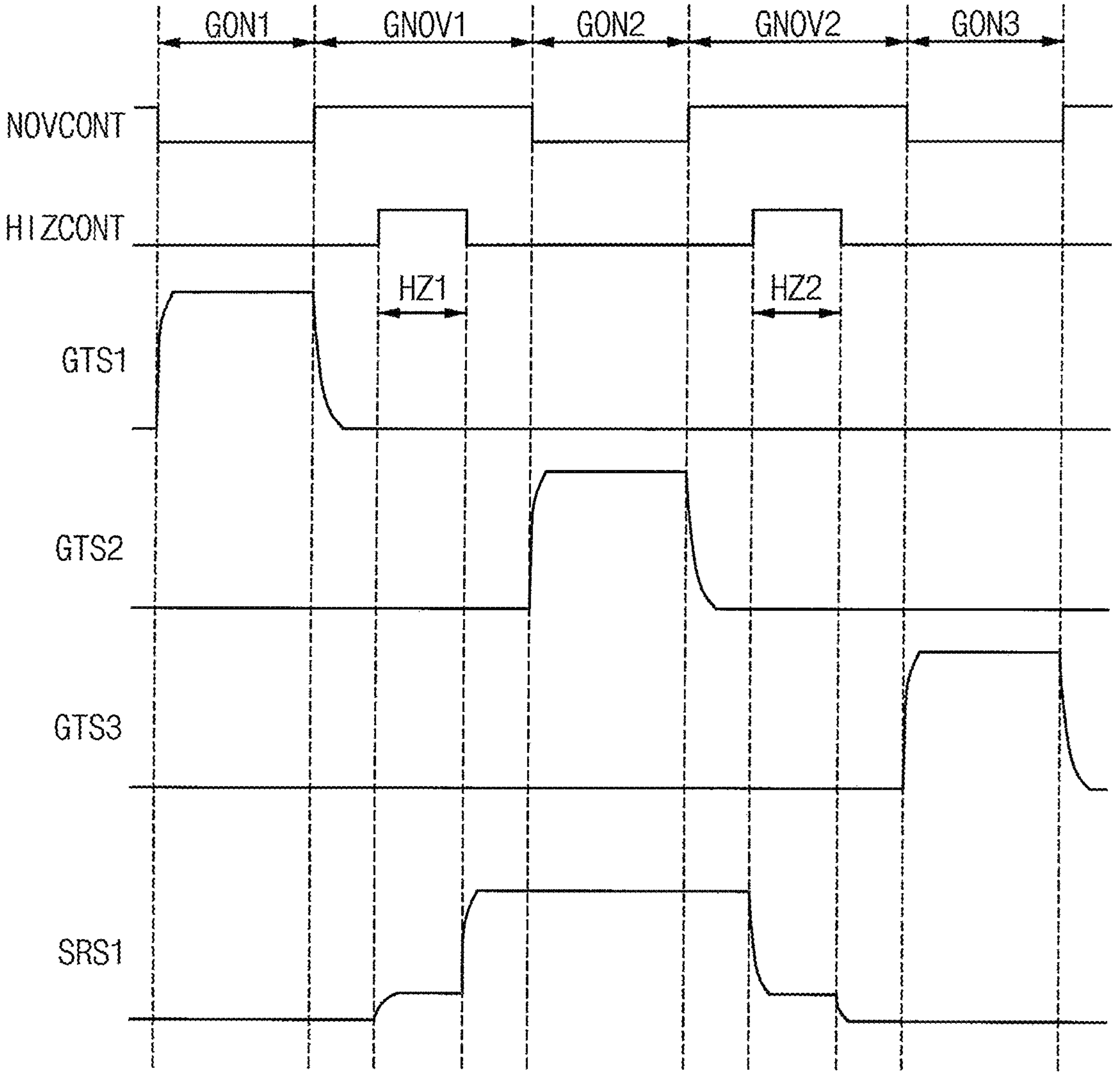

Referring to FIG. 10D, an example of steps S210, S310, S220, S320 and S230 in FIG. 8 and steps S610, S710, S620, S720 and S630 in FIG. 9 is illustrated. The descriptions repeated with FIG. 10A will be omitted.

The non-overlap control signal NOVCONT may be deactivated during a third gate-on interval GON3, and may be activated during a second non-overlap interval GNOV2. The third gate signal GTS3 may be activated only in during third gate-on interval GON3.

The high-impedance control signal HIZCONT may be activated only during the first high-impedance interval HZ1 and a second high-impedance interval HZ2, and may be deactivated during the remaining intervals. The first source signal SRS1 may have a third value for generating the driving current DRC31 supplied to the LED element LED31 during the third gate-on interval GON3, and may have a second high-impedance state during the second high-impedance interval HZ2. For example, a value corresponding to the second high-impedance state may be determined based on the second and third values, and may have an arbitrary value (e.g., a value between the second and third values). As with that described with reference to FIGS. 10B and 10C, at least one of a starting time point, an ending time point, or a length of the second high-impedance interval HZ2 included in the second non-overlap interval GNOV2 may be changeable.

Figure 11A:
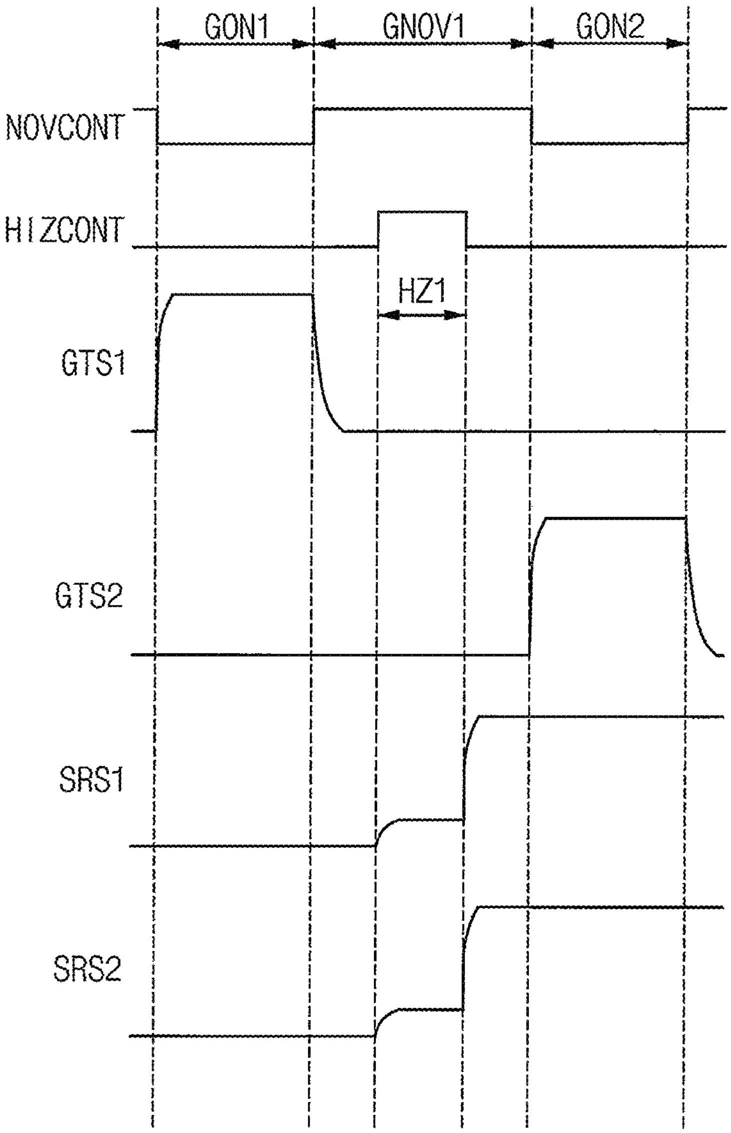

Referring to FIG. 11A, an example of steps S210, S310 and S220 in FIG. 8 and steps S610, S710 and S620 in FIG. 9 is illustrated. The descriptions repeated with FIG. 10A will be omitted.

FIG. 11A illustrates an example where the first and second source signals SRS1 and SRS2 operate based on the same high-impedance control signal HIZCONT and the same high-impedance interval HZ1.

For example, the second source signal SRS2 may have the first value for generating the driving current DRC12 supplied to the LED element LED12 during the first gate-on interval GON1, and may have the second value for generating the driving current DRC22 supplied to the LED element LED22 during the second gate-on interval GON2. In addition, the second source signal SRS2 may have the first high-impedance state during the first high-impedance interval HZ1. However, example embodiments are not limited thereto, and at least one of a starting time point, an ending time point, or a length of the high-impedance interval during which the second source signal SRS2 has the first high-impedance state may be changeable.

Figure 11B:
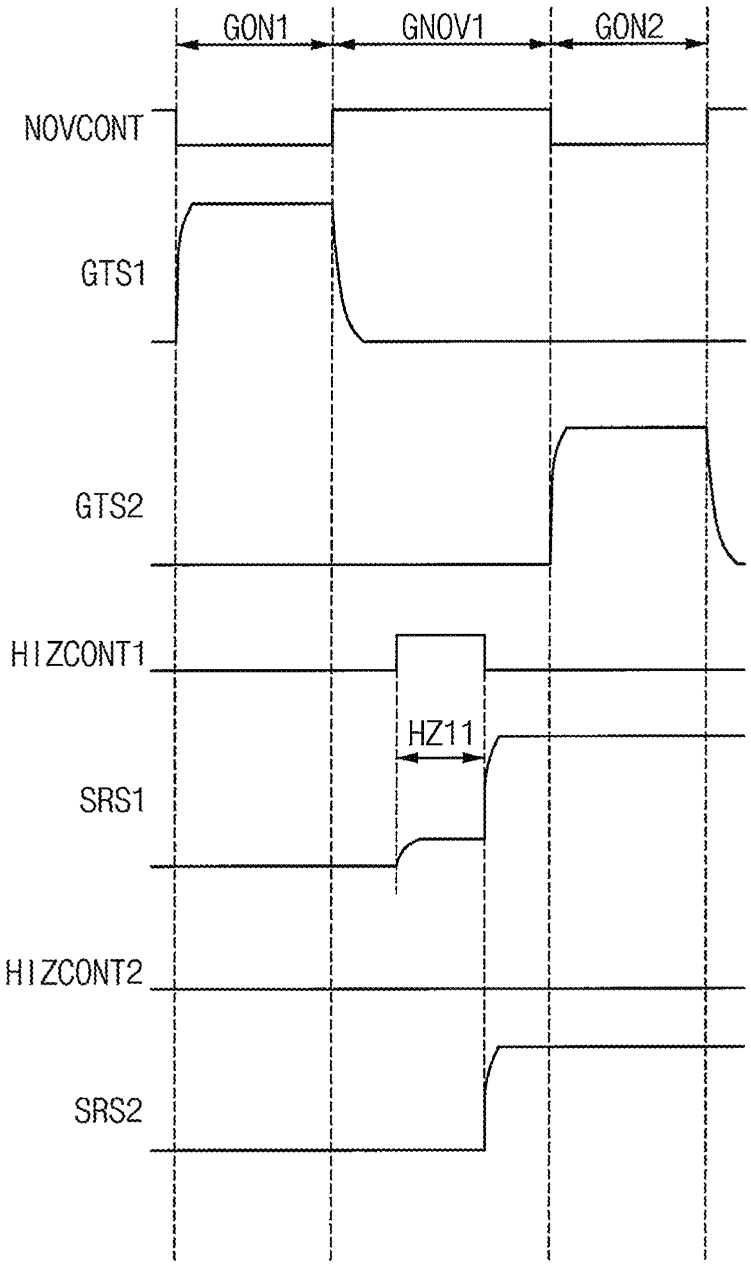

Referring to FIG. 11B, an example of steps S210, S310 and S220 in FIG. 8 and steps S610, S710 and S620 in FIG. 9 is illustrated. The descriptions repeated with FIGS. 10A and 11A will be omitted.

FIG. 11B illustrates an example where the first and second source signals SRS1 and SRS2 operate based on different high-impedance control signals HIZCONT1 and HIZCONT2.

For example, the high-impedance control signal HIZCONT may include the first and second high-impedance control signals HIZCONT1 and HIZCONT2. The first high-impedance control signal HIZCONT1, a first high-impedance interval HZ11 and the operation of the first source signal SRS1 based thereon may be substantially the same as those described with reference to FIG. 10A. The second high-impedance control signal HIZCONT2 may be deactivated during all intervals. The second source signal SRS2 may not have the first high-impedance state during the first non-overlap interval GNOV1, and may have the second value in synchronization with an ending time point of the first high-impedance interval HZ11.

Although FIGS. 11A and 11B illustrate only the operation during the first non-overlap interval GNOV1, an operation during the second non-overlap interval GNOV2 may be implemented similarly to the operation during the first non-overlap interval GNOV1.

Figure 12:
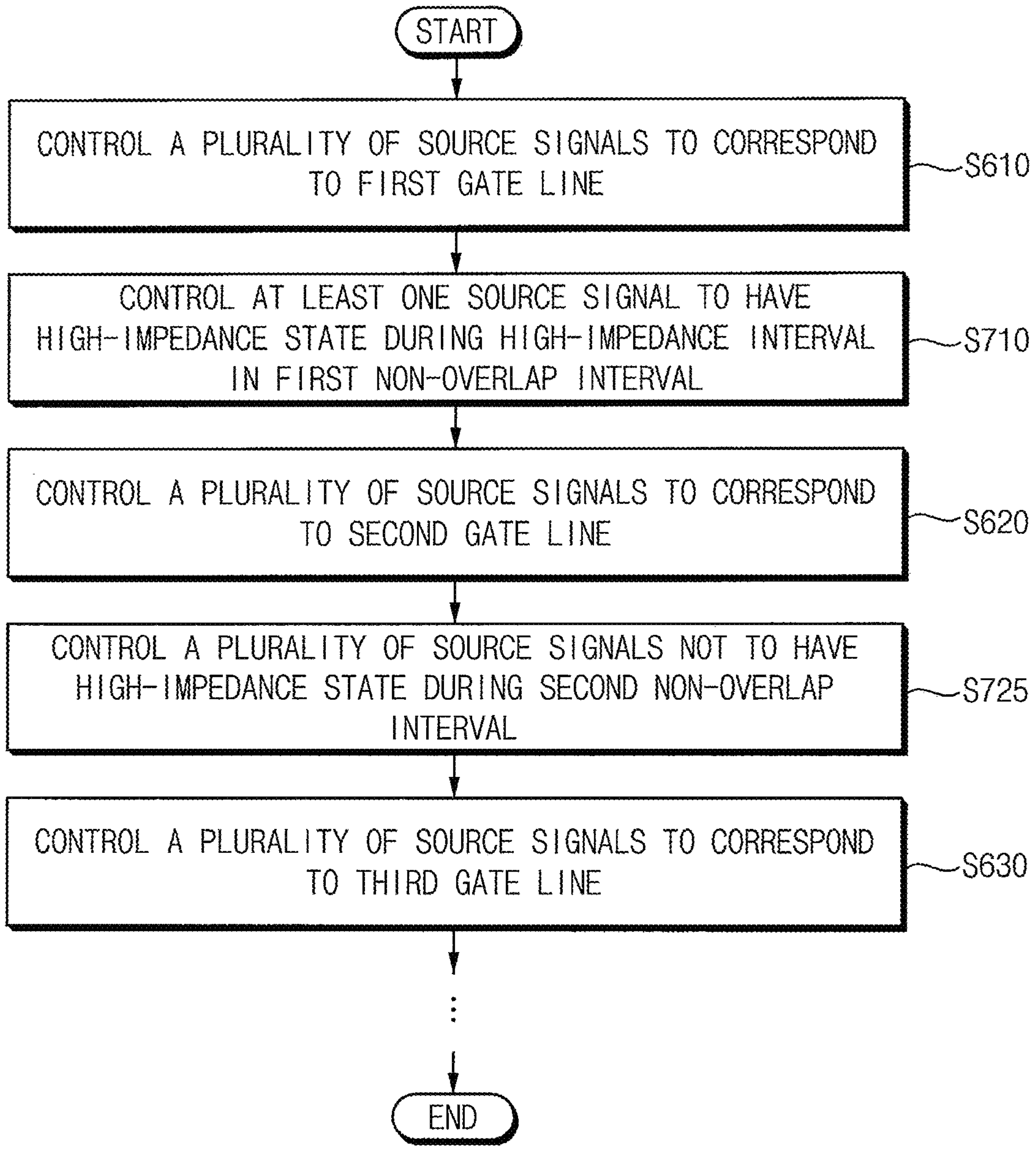
FIG. 12 is a flowchart illustrating an example of generating a plurality of source signals and generating a high-impedance interval in FIG. 3 according to some example embodiments.

FIG. 12 is a flowchart illustrating an example of generating a plurality of source signals and generating a high-impedance interval in FIG. 3 according to some example embodiments. The descriptions repeated with FIG. 9 will be omitted.

Referring to FIGS. 3, 6 and 12, steps S610, S710, S620 and S630 may be substantially the same as steps S610, S710, S620 and S630 in FIG. 9, respectively.

When generating the high-impedance interval (step S700), during the second non-overlap interval, the plurality of source signals SRS1 to SRS3 may be controlled such that the plurality of source signals SRS1 to SRS3 do not have the high-impedance state (step S725). In other words, unlike the first non-overlap interval, the second non-overlap interval may not include the second high-impedance interval. The operation of generating the high-impedance interval may be selectively performed.

Figure 13A:
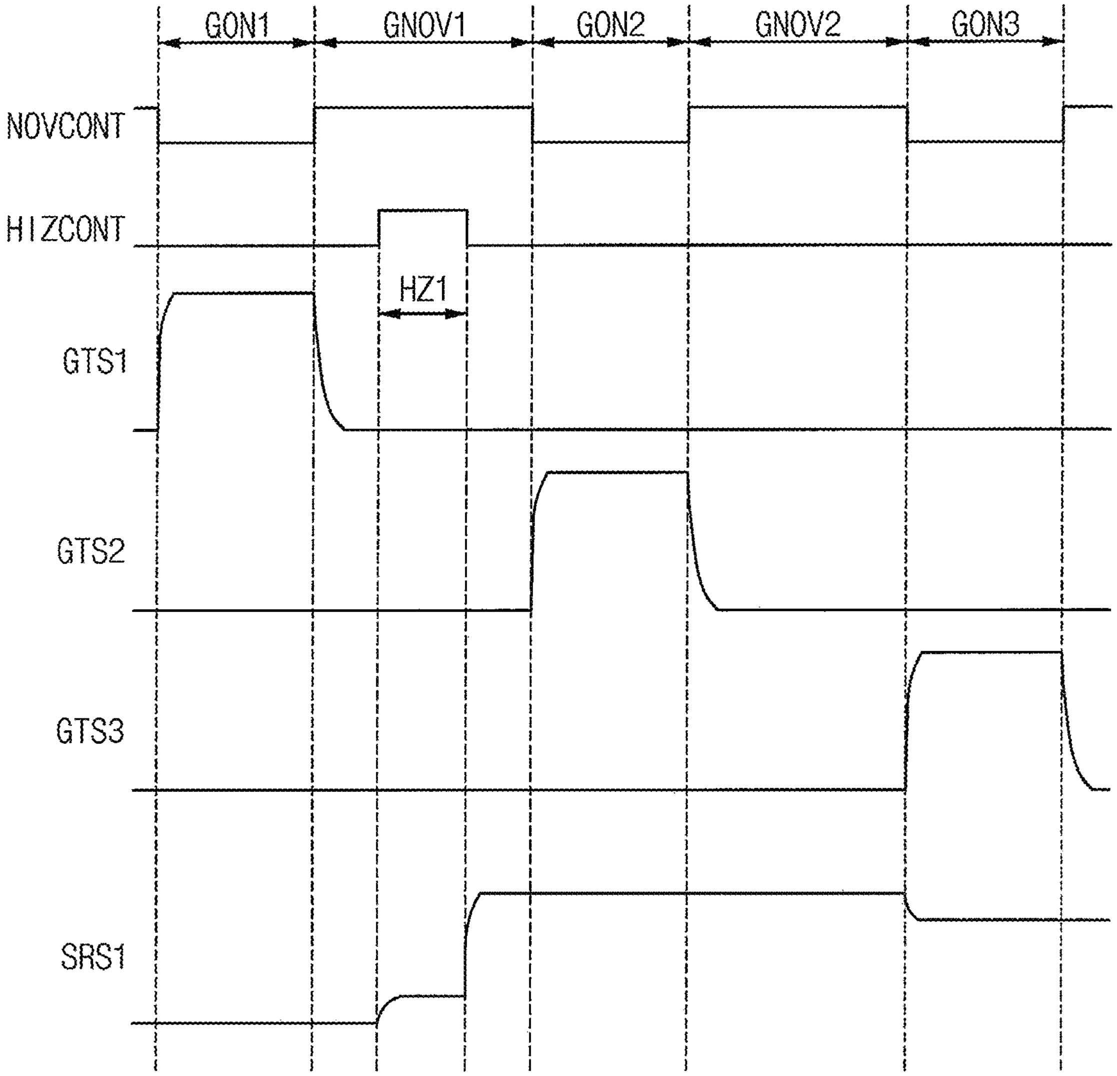
FIGS. 13A and 13B are diagrams for describing an operation of FIG. 12 according to some example embodiments.
Figure 13B:
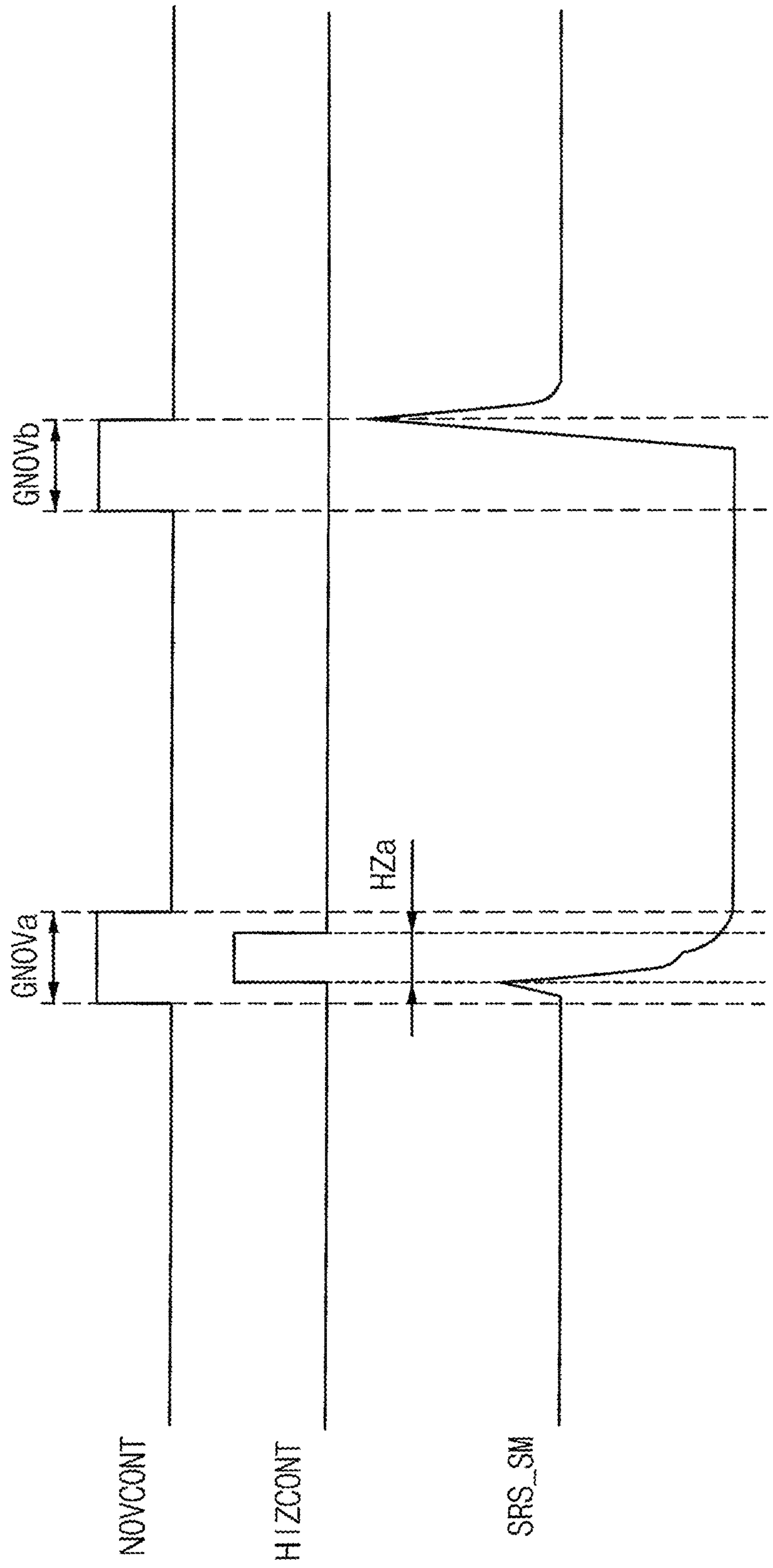

FIGS. 13A and 13B are diagrams for describing an operation of FIG. 12 according to some example embodiments.

Referring to FIG. 13A, an example of steps S210, S310, S220, S320 and S230 in FIG. 8 and steps S610, S710, S620, S725 and S630 in FIG. 12 is illustrated. The descriptions repeated with FIGS. 10A and 10D will be omitted.

The high-impedance control signal HIZCONT may be activated only during the first high-impedance interval HZ1, and may be deactivated during the remaining intervals. Unlike the example of FIG. 10D, since the second high-impedance interval HZ2 is not generated, the first source signal SRS1 may maintain the second value during the second non-overlap interval GNOV2, and may have a fourth value for generating the driving current DRC31 supplied to the LED element LED31 during the third gate-on interval GON3. In addition, since the second high-impedance interval HZ2 is not generated, the first source signal SRS1 may have the fourth value in synchronization with a starting time point of the third gate-on interval GON3. For example, when the first source signal SRS1 does not need to be stabilized quickly because the change in the value of the first source signal SRS1 is not large, e.g., when a difference between the second value and the fourth value is smaller than a reference value, the operation of generating the second high-impedance interval HZ2 may be omitted.

Although FIG. 13A illustrates only the first source signal SRS1, other source signals (e.g., the second source signal SRS2) may operate similarly to the first source signal SRS1. For example, two or more source signals may include the same high-impedance interval, or may not include the same high-impedance interval. For example, during a specific non-overlap interval, one source signal may include the high-impedance interval, and another source signal may not include a high-impedance interval. For example, during another specific non-overlap interval, one source signal may not include the high-impedance interval, and another source signal may include the high-impedance interval.

Referring to FIG. 13B, simulation results representing a change in a source signal SRS_SM when the high-impedance interval is generated and when the high-impedance interval is omitted are illustrated.

When the operation of generating the high-impedance interval is omitted, e.g., during a non-overlap interval GNOVb, a current path may not exist while all gate signals are deactivated. In this case, a voltage level of a pin at which the source signal is output may not be maintained, and may increase to a level of the power supply voltage or may decrease to a level of the ground voltage. For example, FIG. 13B illustrates that the source signal increases to the level of the power supply voltage during the non-overlap interval GNOVb. As a result, there may be a problem that a time required for the source signal to be stabilized to a value corresponding to a next gate-on interval increases.

In contrast, when a high-impedance interval HZa included in a non-overlap interval GNOVa is generated according to some example embodiments, the source signal may be controlled to have the high-impedance state before the source signal increases to the level of the power supply voltage. Thus, a time required for the source signal to be stabilized to a value corresponding to the next gate-on interval may be reduced.

Figure 14:
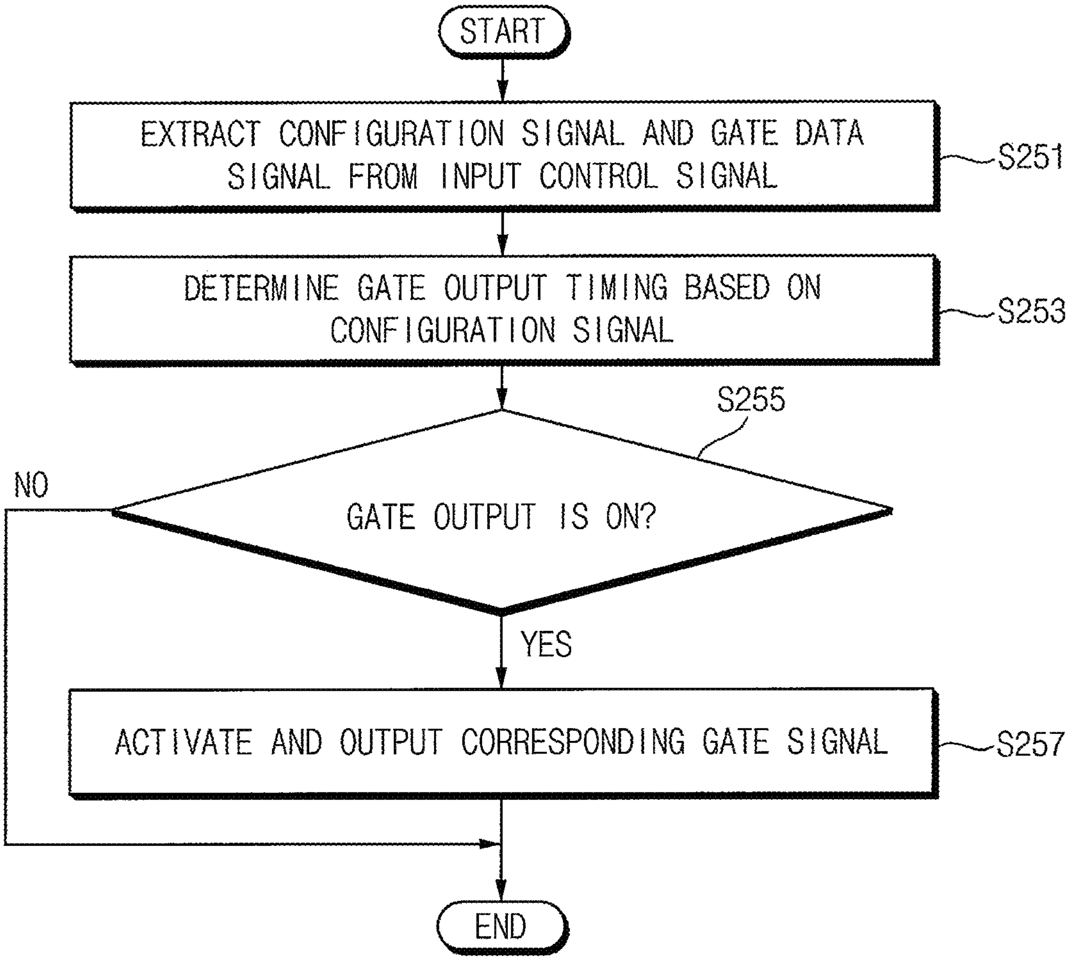
FIG. 14 is a flowchart illustrating an example of generating a plurality of gate signals in FIG. 2 according to some example embodiments.

FIG. 14 is a flowchart illustrating an example of generating a plurality of gate signals in FIG. 2 according to some example embodiments.

Referring to FIGS. 2, 7 and 14, when generating the plurality of gate signals (step S200), the configuration signal CFG and the gate data signal GDAT may be extracted from the input control signal ICONT (step S251). The gate output timing of the plurality of gate signals may be determined based on the configuration signal CFG (step S253).

Thereafter, the plurality of gate signals may be output based on the gate output timing and the gate data signal GDAT. For example, when the gate output is on (step S255: YES), e.g., when a corresponding gate signal is to be turned on, the corresponding gate signal may be activated and output (step S257). For example, the operation during the gate-on interval described with reference to FIGS. 10A, 10B, 10C, 10D, 11A, 11B, 13A and 13B may be performed.

Figure 15:
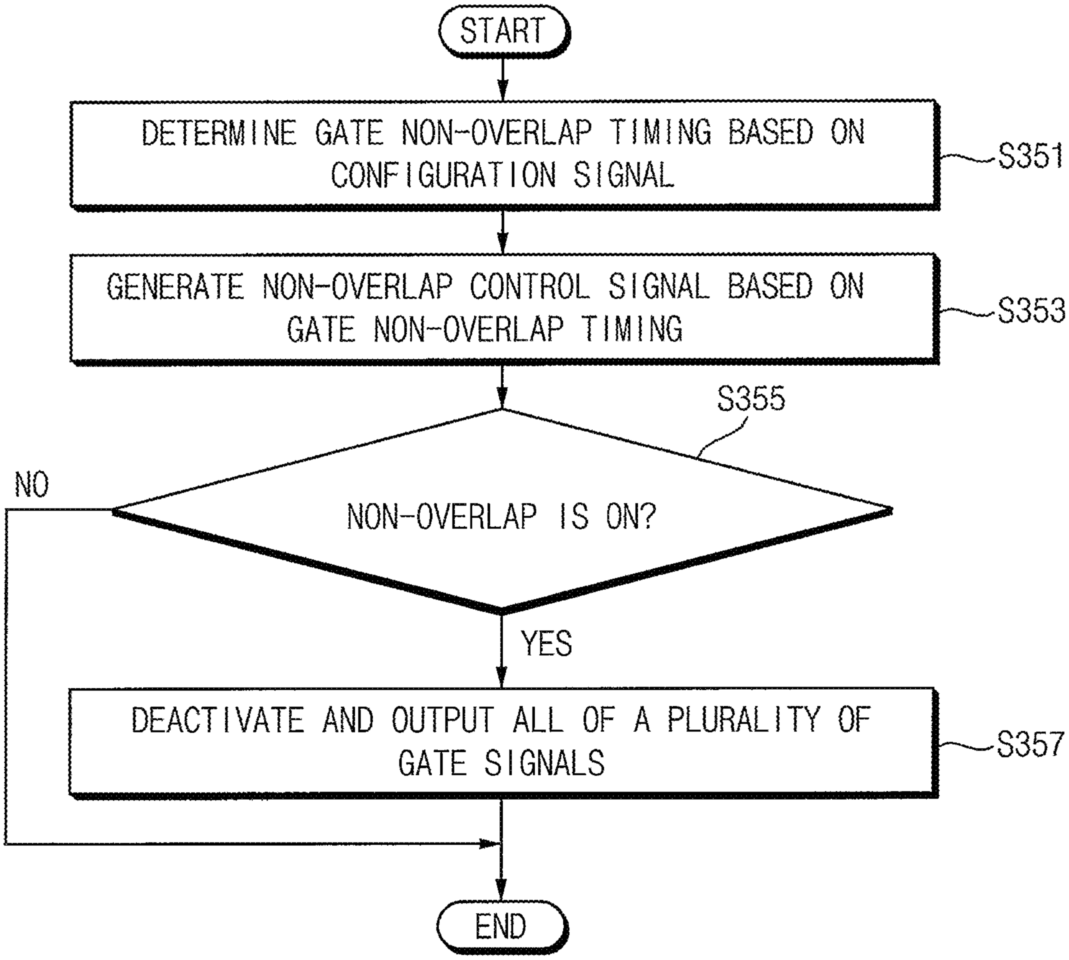
FIG. 15 is a flowchart illustrating an example of generating a non-overlap interval in FIG. 2 according to some example embodiments.

FIG. 15 is a flowchart illustrating an example of generating a non-overlap interval in FIG. 2 according to some example embodiments.

Referring to FIGS. 2, 7 and 15, when generating the non-overlap interval (step S300), the gate non-overlap timing for the non-overlap interval may be determined based on the configuration signal CFG (step S351). The non-overlap control signal NOVCONT may be generated based on the gate non-overlap timing (step S353).

Thereafter, the plurality of gate signals that are deactivated may be output based on the non-overlap control signal NOVCONT. For example, when the non-overlap is on (step S355: YES), e.g., when the non-overlap control signal NOVCONT is activated or turned on, all of the plurality of gate signals may be deactivated and output (step S357). For example, the operation during the non-overlap interval described with reference to FIGS. 10A, 10B, 10C, 10D, 11A, 11B, 13A and 13B may be performed.

In some example embodiments, step S255 in FIG. 14 and step S355 in FIG. 15 may operate in association with each other. For example, the operation of "YES" in step S355 where the non-overlap control signal NOVCONT is activated may correspond to the operation of "NO" in step S255 where the gate output is off. Similarly, the operation of "NO" in step S355 where the non-overlap control signal NOVCONT is deactivated may correspond to the operation of "YES" in step S255 where the gate output is on.

Figure 16:
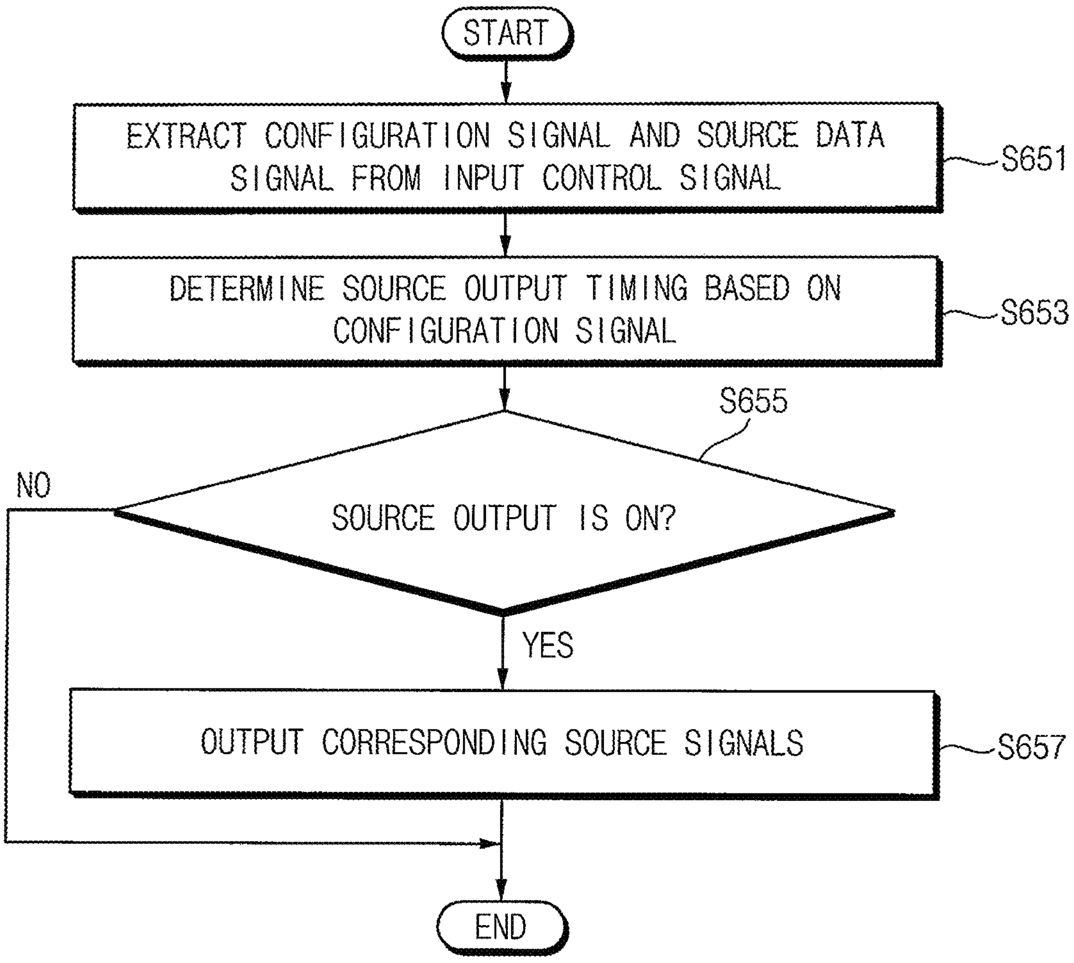
FIG. 16 is a flowchart illustrating an example of generating a plurality of source signals in FIG. 3 according to some example embodiments.

FIG. 16 is a flowchart illustrating an example of generating a plurality of source signals in FIG. 3 according to some example embodiments.

Referring to FIGS. 3, 7 and 16, when generating the plurality of source signals (step S600), the configuration signal CFG and the source data signal SDAT may be extracted from the input control signal ICONT (step S651). The source output timing of the plurality of source signals may be determined based on the configuration signal CFG (step S653).

Thereafter, the plurality of source signals may be output based on the source output timing and the source data signal SDAT. For example, when the source output is on (step S655: YES), e.g., when the corresponding gate signal is to be turned on for outputting the plurality of source signals, the plurality of source signals may be controlled to have corresponding values and may be output (step S657). For example, the operation after the high-impedance interval and during the gate-on interval described with reference to FIGS. 10A, 10B, 10C, 10D, 11A, 11B, 13A and 13B may be performed.

Figure 17:
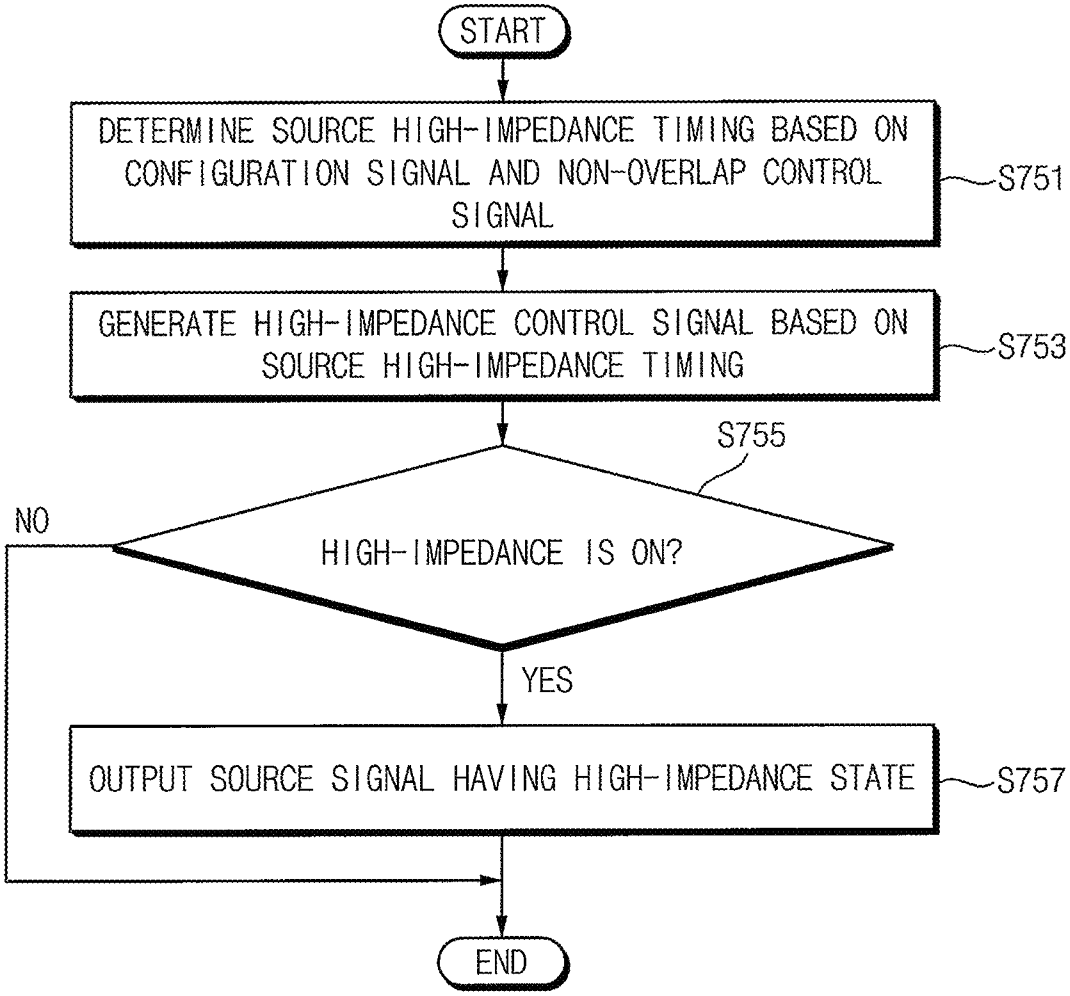
FIG. 17 is a flowchart illustrating an example of generating a high-impedance interval in FIG. 3 according to some example embodiments.

FIG. 17 is a flowchart illustrating an example of generating a high-impedance interval in FIG. 3 according to some example embodiments.

Referring to FIGS. 3, 7 and 17, when generating the high-impedance interval (step S700), the source high-impedance timing for the high-impedance interval may be determined based on the configuration signal CFG and the non-overlap control signal NOVCONT (step S751). The high-impedance control signal HIZCONT may be generated based on the source high-impedance timing (step S753).

Thereafter, at least one source signal having the high-impedance state may be output based on the high-impedance control signal HIZCONT. For example, when the high-impedance is on (step S755: YES), e.g., when the high-impedance control signal HIZCONT is activated or turned on, at least one source signal may be controlled to have the high-impedance state and may be output (step S757). For example, the operation during the high-impedance interval described with reference to FIGS. 10A, 10B, 10C, 10D, 11A, 11B, 13A and 13B may be performed.

In some example embodiments, step S655 in FIG. 16 and step S755 in FIG. 17 may operate in association with each other. For example, the operation of "YES" in step S755 where the high-impedance control signal HIZCONT is activated may correspond to the operation of "NO" in step S655 where the source output is off. Similarly, the operation of "NO" in step S755 where the high-impedance control signal HIZCONT is deactivated may correspond to the operation of "YES" in step S655 where the source output is on.

According to some example embodiments, when the LED backlight unit is driven based on the active matrix scheme and the current driving scheme, the non-overlap interval may be added between intervals where the gate outputs are changed, and it may be controlled that the current path is formed only on a desired line. The non-overlap interval may be controlled by setting the register inside the IC based on the control signal received from the outside, and thus the non-overlap interval may be efficiently adjusted depending on the needs of the user. In addition, to extend the user's control over the gate output timing, two gate output modes may be supported: an internal mode for internally generating the gate output timing, and an external mode for allowing the user to arbitrarily control the gate output timing.

According to some example embodiments, during the non-overlap interval during which all gate signals are deactivated, the source output may be maintained at the high-impedance state to avoid increasing a time required for the source signal to settle to the next value. As a result, the source signal may be stabilized quickly to the next value, and the driving current output from the pixel circuit may be maintained constantly, so that the LED element may be driven smoothly.

According to some example embodiments, to prevent a change in the amount of light emitted when the gate signal is activated before the source output is stabilized due to the fast response of the LED element, the delay may be provided between starting/ending time points of the non-overlap interval and starting/ending time points of the high-impedance interval. Thus, even without external control, the gate output may start after the source output is completely stabilized to sample the source output, and the source output may be held stably.

According to some example embodiments, the gate data signal and the source data signal may be extracted by the pixel driver based on the pin values, the data received through the interface and setting values, and the operation timings may be determined based on the gate data signal and the source data signal.

When determining the non-overlap interval, the gate output mode (e.g., one of the internal mode or the external mode) may be determined first, and the starting/ending time points of the non-overlap interval may be calculated to suit each mode based on the setting value in the register. The non-overlap control signal may be generated based on the calculated timings. Based on the non-overlap control signal, all gate outputs may be output at the low level during the non-overlap interval, and the gate output corresponding to the gate data signal may be output during the gate-on interval.

When determining the high-impedance interval, the high-impedance interval may be generated only within the non-overlap interval, and thus the starting/ending time points of the high-impedance interval may be determined after the starting/ending time points of the non-overlap interval are determined. If the difference between the previous source output value and the next source output value is large, a time required for the source output to be stabilized to the next source output value may decrease using the high-impedance interval. Thus, the high-impedance interval may be selectively set or added as needed. In addition, the high-impedance interval may be set based on the external setting values, and the delay between starting/ending time points of the non-overlap interval and starting/ending time points of the high-impedance interval may be adjusted depending on the needs of the user.

According to some example embodiments, the non-overlap interval and the high-impedance interval may be organically calculated and controlled inside the chip. In the normal situation, the timing of the non-overlap interval with the previous source output value may be considered. In the abnormal situation, the malfunction caused by the non-overlap interval and/or the high-impedance interval may be prevented. For example, in the abnormal situation where the non-overlap interval is very short or the high-impedance interval desired by the user is longer than the non-overlap interval, the high-impedance interval may not be generated, and the non-overlap interval and the high-impedance interval may be automatically reset. Therefore, it may be designed that the control signals operate organically with each other.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 18:
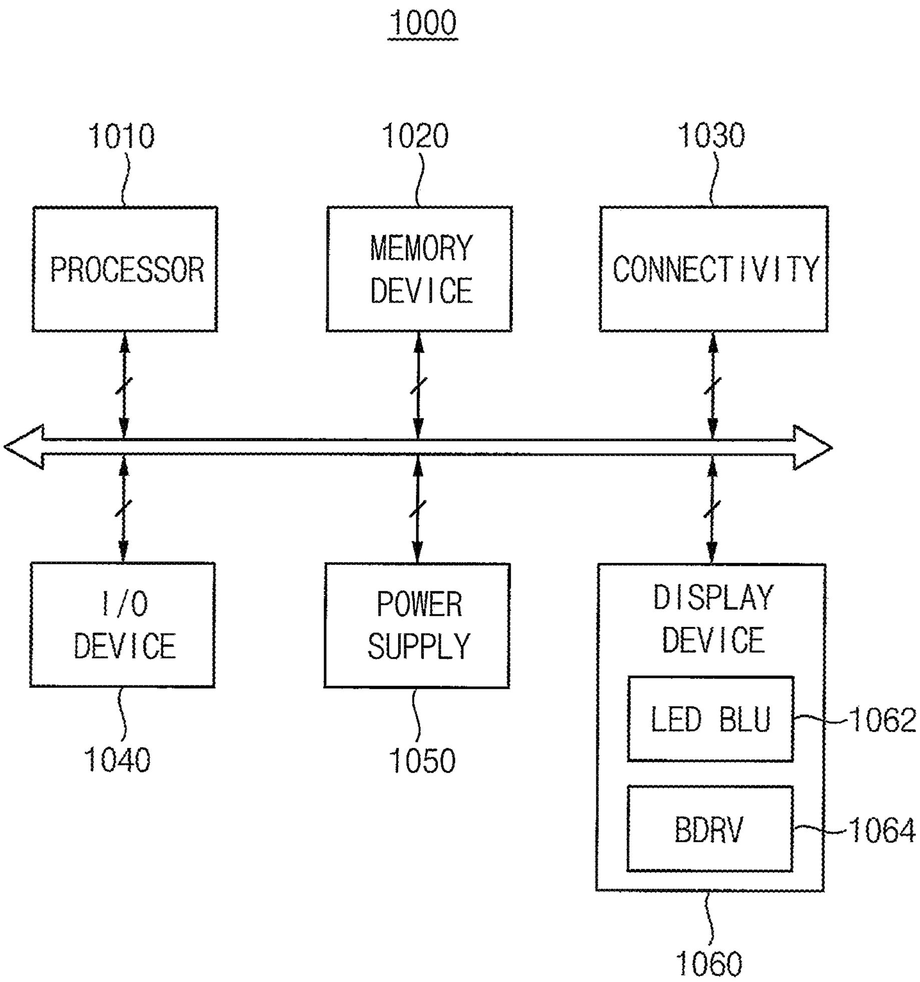
FIG. 18 is a block diagram illustrating an electronic system according to some example embodiments.

FIG. 18 is a block diagram illustrating an electronic system according to some example embodiments.

Referring to FIG. 18, an electronic system 1000 may include a processor 1010, a memory device 1020, a connectivity 1030, an input/output (I/O) device 1040, a power supply 1050 and a display device 1060. The electronic system 1000 may further include a plurality of ports for communicating a video card, a sound card, a memory card, a universal serial bus (USB) device, other electronic devices, etc.

The processor 1010 may control operations of the electronic system 1000. The processor 1010 may execute an operating system and at least one application to provide an internet browser, games, videos, or the like. The memory device 1020 may store data for the operations of the electronic system 1000. The connectivity 1030 may communicate with an external device and/or system. The I/O device 1040 may include an input device such as a keyboard, a keypad, a mouse, a touchpad, a touch-screen, a remote controller, etc., and an output device such as a printer, a speaker, etc. The power supply 1050 may provide a power for operations of the electronic system 1000.

The display device 1060 may include an LED backlight unit (LED BLU) 1062 and a backlight driver (BDRV) 1064. The display device 1060, the LED backlight unit 1062 and the backlight driver 1064 may be the display device, the LED backlight unit and the backlight driver according to some example embodiments, respectively. The backlight driver 1064 may perform the method of driving the LED backlight unit 1062 according to some example embodiments, including any methods shown in any of FIGS. 1 to 17.

As described herein, any devices, systems, modules, units, controllers, circuits, and/or portions thereof according to any of the example embodiments (including, without limitation, display device 100, system-on-chip 200, timing controller 220, backlight controller 240, display driver 300, data driver 310, scan driver 320, display panel 400, backlight driver 500, pixel driver 510, pixel driver 520, extractor 521, controller 522, register 523, buffer 524, current digital-to-analog converter 525, switch SW, pixel circuit 530, LED element 540, LED backlight unit 600, electronic system 1000, processor 1010, memory device 1020, connectivity 1030, I/O device 1040, power supply 1050, display device 1060, LED backlight unit 1062, backlight driver 1064, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, units, controllers, circuits, and/or portions thereof according to any of the example embodiments, and/or any portions thereof.

The inventive concepts may be applied to (e.g., included in) various electronic devices and systems that include the display devices. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of driving a light emitting diode (LED) backlight unit, the LED backlight unit including a plurality of LED elements that are connected to a plurality of gate lines and a plurality of source lines, the method comprising:

generating a plurality of gate signals applied to the plurality of gate lines;

generating, while the plurality of gate signals are generated, a non-overlap interval between activation intervals of two adjacent gate signals, all of the plurality of gate signals being deactivated during the non-overlap interval;

generating a plurality of source signals applied to the plurality of source lines; and generating, while the plurality of source signals are generated, a high-impedance interval exclusively in the non-overlap interval, at least some of the plurality of source signals having a high-impedance state during the high-impedance interval.

2. The method of claim 1, wherein generating the plurality of gate signals includes:

during a first gate-on interval, activating a first gate signal applied to a first gate line; and during a second gate-on interval subsequent to the first gate-on interval, activating a second gate signal applied to a second gate line adjacent to the first gate line.

3. The method of claim 2, wherein generating the non-overlap interval includes:

during a first non-overlap interval between the first gate-on interval and the second gate-on interval, deactivating all of the plurality of gate signals.

4. The method of claim 3, wherein generating the high-impedance interval includes:

during a first high-impedance interval included in the first non-overlap interval, controlling a first source signal applied to a first source line such that the first source signal has the high-impedance state.

5. The method of claim 4, wherein at least one of a starting time point, an ending time point, or a length of the first high-impedance interval is changeable.

6. The method of claim 4, wherein generating the high-impedance interval further includes:

during a second high-impedance interval included in the first non-overlap interval, controlling a second source signal applied to a second source line such that the second source signal has the high-impedance state.

7. The method of claim 6, wherein a starting time point, an ending time point, and a length of the second high-impedance interval are same as a starting time point, an ending time point, and a length, respectively, of the first high-impedance interval.

8. The method of claim 6, wherein at least one of a starting time point, an ending time point, or a length of the second high-impedance interval is different from at least one of a starting time point, an ending time point, or a length, respectively, of the first high-impedance interval.

9. The method of claim 4, wherein generating the plurality of gate signals further includes:

during a third gate-on interval subsequent to the second gate-on interval, activating a third gate signal applied to a third gate line adjacent to the second gate line.

10. The method of claim 9, wherein generating the non-overlap interval further includes:

during a second non-overlap interval between the second gate-on interval and the third gate-on interval, deactivating all of the plurality of gate signals.

11. The method of claim 10, wherein generating the high-impedance interval further includes:

during a second high-impedance interval included in the second non-overlap interval, controlling the first source signal such that the first source signal has the high-impedance state.

12. The method of claim 10, wherein generating the high-impedance interval further includes:

during the second non-overlap interval, controlling the first source signal such that the first source signal does not have the high-impedance state.

13. The method of claim 1, wherein generating the plurality of gate signals includes:

extracting a configuration signal and a gate data signal from an input control signal;

determining a gate output timing of the plurality of gate signals based on the configuration signal; and outputting the plurality of gate signals based on the gate output timing and the gate data signal.

14. The method of claim 13, wherein generating the non-overlap interval includes:

determining a gate non-overlap timing for the non-overlap interval based on the configuration signal;

generating a non-overlap control signal based on the gate non-overlap timing; and outputting the plurality of gate signals that are deactivated based on the non-overlap control signal.

15. The method of claim 14, wherein generating the plurality of source signals includes:

extracting a source data signal from the input control signal;

determining a source output timing of the plurality of source signals based on the configuration signal; and outputting the plurality of source signals based on the source output timing and the source data signal.

16. The method of claim 15, wherein generating the high-impedance interval includes:

determining a source high-impedance timing for the high-impedance interval based on the configuration signal and the non-overlap control signal;

generating a high-impedance control signal based on the source high-impedance timing; and outputting at least one source signal that has the high-impedance state based on the high-impedance control signal.

17. A display device, comprising:

a light emitting diode (LED) backlight unit including a plurality of LED elements that are connected to a plurality of gate lines and a plurality of source lines; and a backlight driver configured to drive the LED backlight unit, wherein the backlight driver is configured to:

generate a plurality of gate signals applied to the plurality of gate lines;

generate, while the plurality of gate signals are generated, a non-overlap interval between activation intervals of two adjacent gate signals, all of the plurality of gate signals being deactivated during the non-overlap interval;

generate a plurality of source signals applied to the plurality of source lines; and generate, while the plurality of source signals are generated, a high-impedance interval exclusively in the non-overlap interval, at least some of the plurality of source signals having a high-impedance state during the high-impedance interval.

18. The display device of claim 17, wherein the backlight driver includes:

a plurality of pixel circuits configured to generate a plurality of driving currents supplied to the plurality of LED elements based on the plurality of gate signals and the plurality of source signals; and a pixel driver configured to generate the plurality of gate signals and the plurality of source signals, and provide the plurality of gate signals and the plurality of source signals to the plurality of pixel circuits.

19. The display device of claim 17, further comprising:

a display panel configured to display an image based on light provided from the LED backlight unit; and a display driver configured to drive the display panel.

20. A method of driving a light emitting diode (LED) backlight unit, the LED backlight unit including a plurality of LED elements that are connected to a plurality of gate lines and a plurality of source lines, the method comprising:

activating a first gate signal of a plurality of gate signals applied to a first gate line among the plurality of gate lines during a first gate-on interval;

outputting, while the first gate signal is activated, a first source signal to generate a first driving current supplied to a first LED element among the plurality of LED elements, the first LED element being connected to the first gate line and being connected to a first source line among the plurality of source lines;

activating, during a second gate-on interval after the first gate-on interval, a second gate signal of the plurality of gate signals applied to a second gate line among the plurality of gate lines, the second gate line being adjacent to the first gate line;

outputting, while the second gate signal is activated, the first source signal to generate a second driving current supplied to a second LED element among the plurality of LED elements, the second LED element being connected to the second gate line and being connected to the first source line;

deactivating, during a first non-overlap interval between the first gate-on interval and the second gate-on interval, all of the plurality of gate signals applied to the plurality of gate lines; and controlling, during a first high-impedance interval exclusively in the first non-overlap interval, the first source signal, such that the first source signal has a high-impedance state, wherein the first and second LED elements are configured to maintain a light-emitting state subsequent to the first and second gate signals being deactivated subsequent to the first and second gate-on intervals, and wherein at least one of a starting time point, an ending time point, or a length of the first high-impedance interval is changeable.

* * * * *